US006249294B1

(12) United States Patent
Lefebvre et al.

(10) Patent No.: US 6,249,294 B1
(45) Date of Patent: Jun. 19, 2001

(54) 3D GRAPHICS IN A SINGLE LOGICAL SREEN DISPLAY USING MULTIPLE COMPUTER SYSTEMS

(75) Inventors: Kevin Lefebvre; Don B. Hoffman; Michael T. Hamilton, all of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/138,456

(22) Filed: Aug. 21, 1998

Related U.S. Application Data

(63) Continuation-in-part of application No. 09/119,106, filed on Jul. 20, 1998, now abandoned.

(51) Int. Cl.[7] .................................................. G06F 15/16
(52) U.S. Cl. ........................... 345/504; 345/506; 709/209
(58) Field of Search ..................................... 345/501–506, 345/520, 521, 522, 513, 1, 2; 709/208, 219, 230, 249, 311, 312, 209

(56) References Cited

U.S. PATENT DOCUMENTS

| | | | |
|---|---|---|---|
| 5,313,581 | * 5/1994 | Giokas et al. ........................ | 709/300 |
| 5,408,600 | * 4/1995 | Garfinkel et al. .................... | 709/204 |
| 5,537,548 | * 7/1996 | Fin et al. ............................. | 709/302 |
| 5,568,616 | * 10/1996 | Narayanaswami ................... | 709/232 |
| 5,673,403 | * 9/1997 | Brown et al. . | |
| 5,748,189 | * 5/1998 | Trueblood ........................... | 245/331 |
| 5,819,077 | * 10/1998 | Koga et al. .......................... | 712/220 |
| 5,974,049 | * 10/1999 | Ratcliff et al. ....................... | 370/401 |
| 6,023,558 | * 2/2000 | Grabowski ........................... | 395/109 |
| 6,046,752 | * 4/2000 | Kirkland et al. ..................... | 345/505 |

OTHER PUBLICATIONS

Chen, B. et al., "JavaGL–A 3D Graphics Library in Java for Internet Browsers", IEEE Transactions on Consumer Electronics, vol. 43, No. 3, Aug. 1997, pp. 271–278.*
Celes, W. et al., "Act: an easy–to–use and dynamically extensible 3D graphics library", Proceedings of The X Brazilian Symposium on Computer Graphics and Image Processing, 1997, pp. 26–33.*
Detter, R., "X windows the great integrator", IEE Review, Jun. 1990, pp. 219–222.*
Lefebvre, K., "Hewlett–Packard's Large Screen Multi–Display Technology", Hewlett–Packard Company, http://www.hp.com/xwindow/sharedInfo/Whitepapers/Sls3d/sls_3d.html.*

(List continued on next page.)

Primary Examiner—Ulka J. Chauhan
(74) Attorney, Agent, or Firm—Kevin M. Hart

(57) ABSTRACT

A single logical screen computer display uses multiple remote computer systems operable to perform hardware accelerated 3D graphics operations. The display system includes a client process, a first slave host computer coupled to first display hardware, a second slave host computer coupled to second display hardware, and a network broadcast path between the client process and the first and second slave host computers. The client process is operable to broadcast OGL command buffers to the first and second slave host computers using the network broadcast path. The first and second slave host computers are operable to execute OGL commands in the OGL command buffers and to render the results on the first and second display hardware, respectively. First and second X server processes run on the first and second slave hosts, and first and second OGL daemon processes also run on the first and second slave hosts. The network broadcast path bypasses the X server processes, thereby providing greatly enhanced 3D graphics performance over the network.

31 Claims, 15 Drawing Sheets

OTHER PUBLICATIONS

Spencer, T. et al., "Advanced display technologies on HP–UX worksations", Hewlett–Packard Journal, V49, n2, May 1998, p46(5).*

Hewlett–Packard X Server Team, "Understanding X Features: Distributed Single Logical Screen", http://www.hp.com/xwindow/shareInfo/Whitepapers/Slsd/slsd.html.*

Karlton, P., OpenGL Grpahics with the X Window System (Version 1.2), 1992–1997.*

Rogelberg, D. (Editor), OpenGL Reference Manual, Chapters 1,2,5, 1994.*

Schikore, D., Fischer, R., Frank, R., Frank, Gaunt, R., Hobson, J., and Whitlock, B., "High–Resolution Multi-projector Display Walls", IEEE Computer Graphics and Applications, vol.20 4, Jul.–Aug. 2000, pp. 38–44.*

Humphreys, G., Hanrahan, P., "A Distributed Graphics System for Large Tiled Displays", Proceedings of the conference on Visualization '99, 1999, pp. 215–223.*

Dykstra, P., "X11 in Virtual Environments", Proceedings of the IEEE 1993 Symposium on Research Frontiers in Virtual Reality, 1993, pp. 118–119.*

* cited by examiner

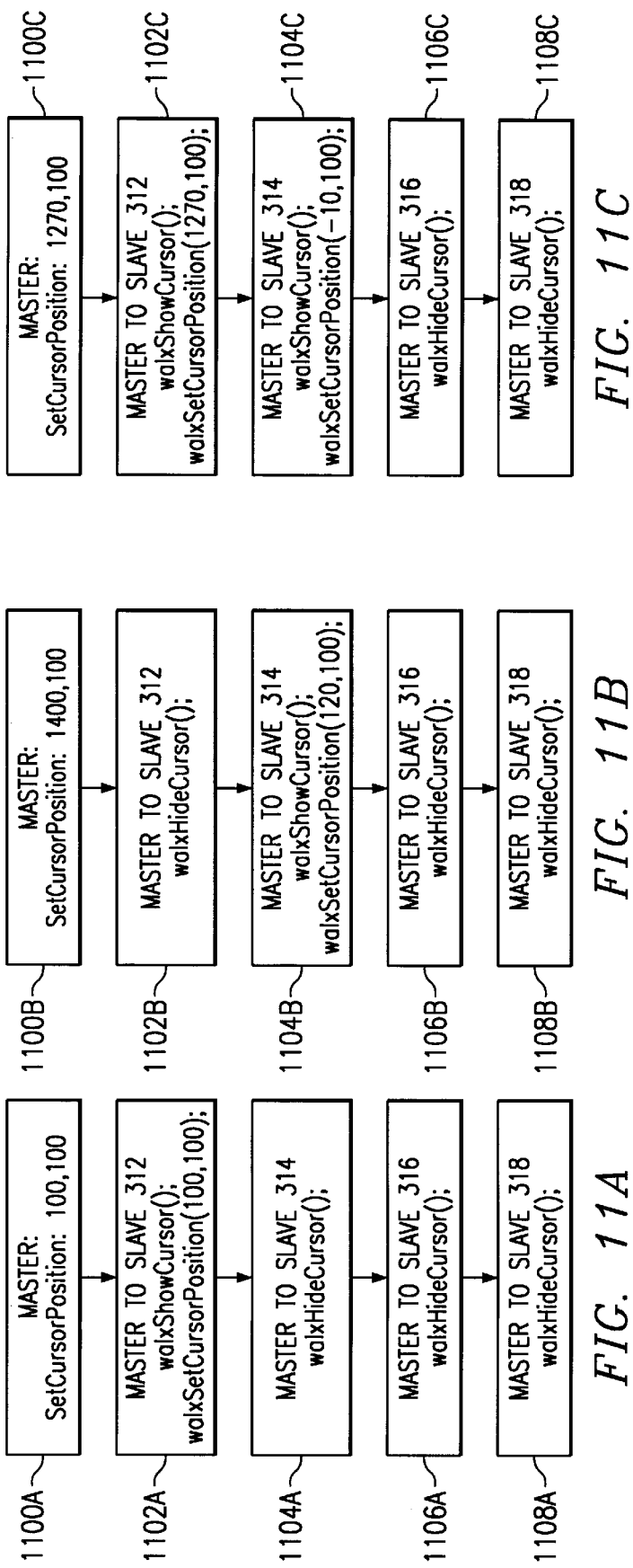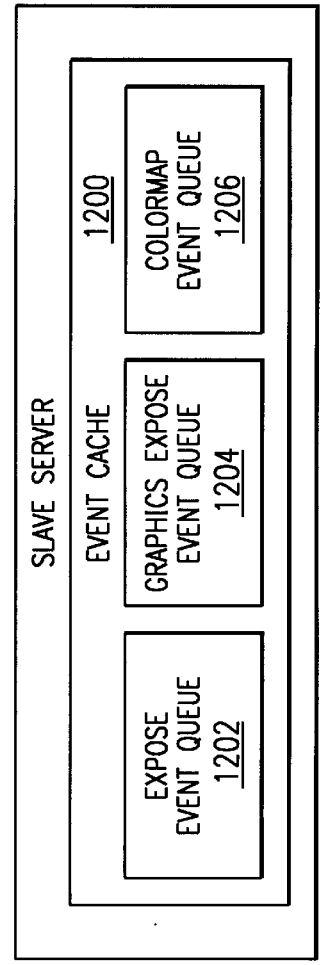

3D GRAPHICS IN A SINGLE LOGICAL SREEN DISPLAY USING MULTIPLE COMPUTER SYSTEMS

RELATED APPLICATIONS

This application is a continuation-in-part of U.S. patent application ser. No. 09/119,106, filed Jul. 20, 1998, now abandoned. This application is related to U.S. patent application ser. No. 09/119,107, filed Jul. 20, 1998, titled "Single Logical Screen Display Using Multiple Remote Computer Systems," and to U.S. patent application ser. No. 09/119,460, filed Jul. 20, 1998, titled "Event Handling in a Single Logical Screen Display Using Multiple Remote Computer Systems."

FIELD OF THE INVENTION

This invention relates to computer graphics display systems. More particularly, the invention relates to a solution for providing 3D graphics in a single logical screen display supported by multiple remote computer systems.

BACKGROUND

Computer graphics displays that have very large sizes and high resolutions are useful in a variety of applications. For example, such displays can be used to create immersive environments in which viewers are surrounded by the display. Such displays are also useful when large amounts of data must be viewable on one large screen, such as in stock market applications, large process control applications and the like. Frequently, in order to provide such a large display with adequately high resolution, a composite screen must be constructed using numerous separate physical display devices such as CRT-type monitors. If the composite screen is to be used interactively, then suitable control mechanisms must also be for a Large, Physical Workspace" (hereinafter "Walls, et al."), which patent application is hereby incorporated entirely by reference.

By way of background, the X Window System is a standard for implementing window-based user interfaces in a networked computer system. For a more detailed discussion of the X Window System and the X Protocol that defines it, see Adrian Nye, *X Protocol Reference Manual Volume Zero* (O'Reilly & Associates 1990). FIG. 1 illustrates a conventional X Window System configuration that does not implement single logical screen functionality. Host computer system 100 is coupled to host computer system 102 via connections to local area network ("LAN") 104. Host computer system 102 drives display hardware 106 via bus 108 and is capable of receiving input from devices such as a keyboard 109, a mouse 111 or other devices such as a button box 113. X client software 110 runs on host 100, while X server software 112 runs on host 102. Although configurations of client 110 may vary, a typical client would comprise an application 114 that communicates with server 112 by means of calls to low-level library Xlib 116. Optionally, Xlib 116 may be augmented by a higher-level library such as XToolkit 118. The purpose of X server 112 is to implement a user interface on display hardware 106 responsive to commands received from X client 110 and input devices 109, 111 and 113. A conventional X server 112 includes three basic components: a device independent X ("DIX") layer 120, an operating system ("OS") layer 122, and a device dependent X ("DDX") layer 124. DIX layer 120 contains the parts of the server software that are portable from one hardware/OS implementation to another. OS layer 122 implements server functions that vary with specific operating systems. DDX layer 124 implements server functions that depend on the capabilities of particular graphics hardware and input devices. For a more detailed discussion of conventional X server 112, see, Elias Israel and Erik Fortune, The X Window System Server (Digital Press 1992) (hereinafter "Israel and Fortune").

FIG. 2 illustrates an X Window System configuration that implements 2D single logical screen functionality according to the teaching of Walls, et al. In the configuration of FIG. 2, augmented X server software 200 runs on host computer 220. X server 200 controls multiple display hardware devices 202, 204, 208 and 208 via buses 203, 205, 207 and 209. This capability is accomplished by the addition of a single-logical-screen ("SLS") layer 210 to X server 200, as well as a separate DDX layer 212, 214, 216 and 218 for each of the display hardware devices. An advantage of the configuration of FIG. 2 is that single logical screen functionality is provided in a way that is transparent to X Client 110. In other words, the single logical screen functionality provided by X Server 200 enables X Client 110 to function as though it were communicating with one large, high-resolution device. The overhead required to provide the high-resolution single logical screen functionality using several smaller-resolution devices is subsumed entirely within X server 200.

The configuration of FIG. 2 does have limitations, however. One of the challenges associated with implementing a very large single logical screen display is that many physical display devices are required to implement the composite screen. Moreover, each of the physical display devices in the composite screen is usually driven by a separate graphics hardware subsystem. Typically, each such graphics hardware subsystem resides on a graphics circuit card (or cards), which must be installed in a bus socket (or sockets) on the backplane of a host computer system. Unfortunately, there is a physical limit to the number of graphics circuit cards that may be installed into the bus sockets that are provided on a single backplane. While special-purpose backplanes have been built that are capable of receiving as many as nine graphics circuit cards at once, such special-purpose implementations are expensive. The backplanes in more conventional computer systems are only able to receive about four graphics circuit cards for 2D hardware, and fewer than four cards for 3D hardware. (3D graphics circuit cards can require three or more bus slots per card.)

One way of addressing the need for having many graphics circuit cards when attempting to implement a very large single logical screen display would be to use numerous computer systems to support the composite screen. In this manner, numerous backplanes would be provided for receiving the graphics circuit cards (one backplane per computer system). Moreover, each of the computer systems used to support the larger logical screen could be configured like computer system 220 shown in FIG. 2. Unfortunately, the configuration shown in FIG. 2 is only transparent to X client 110 when X server 200 manages the entire logical screen. Therefore, if multiple computer systems 220 were used in order to create a larger logical screen, with each of the computer systems 220 running a separate X server 200, then X client 110 would have to assume a degree of the overhead required to implement the SLS functionality for the larger composite screen. Moreover, only 2D single logical screen functionality is supported by the configuration of FIG. 2.

It is therefore an object of the present invention to provide 3D SLS functionality for very large composite screens in a manner that is transparent to the application software in the X client.

It is a further object of the invention to provide such 3D SLS functionality in a manner that enables multiple backplanes to be used for implementing very large composite screens.

SUMMARY OF THE INVENTION

The invention includes a number of unique aspects, each of which contributes to the achievement of the above-stated objects in a high-performance manner.

In one aspect, the invention includes a single logical screen computer display using multiple remote computer systems operable to perform hardware accelerated 3D graphics operations. The display system includes a client process, a first slave host computer coupled to first display hardware, a second slave host computer coupled to second display hardware, and a network broadcast path between the client process and the first and second slave host computers. The client process is operable to broadcast OGL command buffers to the first and second slave host computers using the network broadcast path. The first and second slave host computers are operable to execute OGL commands in the OGL command buffers and to render the results on the first and second display hardware, respectively.

In a further aspect, first and second X server processes run on the first and second slave hosts, and first and second OGL daemon processes also run on the first and second slave hosts. The first and second OGL daemons are operable to execute OGL commands in the OGL command buffers and to render the results on the first and second display hardware. Importantly, the network broadcast path bypasses the X server processes, thereby providing greatly enhanced 3D graphics performance over the network.

In a still further aspect, first and second receive daemon processes run on the first and second slave hosts. The first and second receive daemon processes are operable to store OGL command buffers broadcast by the client process in first and second shared memory structures, and the first and second OGL daemons are operable to access the first and second shared memory structures for the purpose of executing OGL commands stored there. The network broadcast path may be implemented using UDP connections over a local area network. Additionally, a first control connection may be provided between the client process and the first slave host computer; and a second control connection may be provided between the client process and the second slave host computer. The first and second control connections may be used to coordinate the broadcasting of OGL command buffers by the client process. The control connections may be implemented using TCP connections over the local area network.

In yet another aspect, the 3D SLS functionality provided by the invention is implemented at the API dispatch layer between the client application and the 3D rendering library implementation. Thus, a primary advantage of the inventive 3D single logical screen display system is that it provides single logical screen functionality that is totally transparent to the client application running in the client process. Another advantage of the inventive display system is that each physical display device in the 3D single logical screen may be supported by a separate host's backplane, thereby enabling very large 3D single logical screens to be constructed.

BRIEF DESCRIPTION OF THE DRAWINGS

FIGS. 11A–C are flow diagrams illustrating three different cursor positioning examples according to the method of FIG. 10.

FIG. 12 is a block diagram illustrating an event cache within one of the slave servers of FIG. 3.

DETAILED DESCRIPTION OF THE PREFERRED EMBODIMENTS

The preferred embodiments of the invention will now be described in detail, first with reference to their architecture and then with reference to their functional behavior.

1 Architecture of the 2D SLS Substrate

Figure 3:
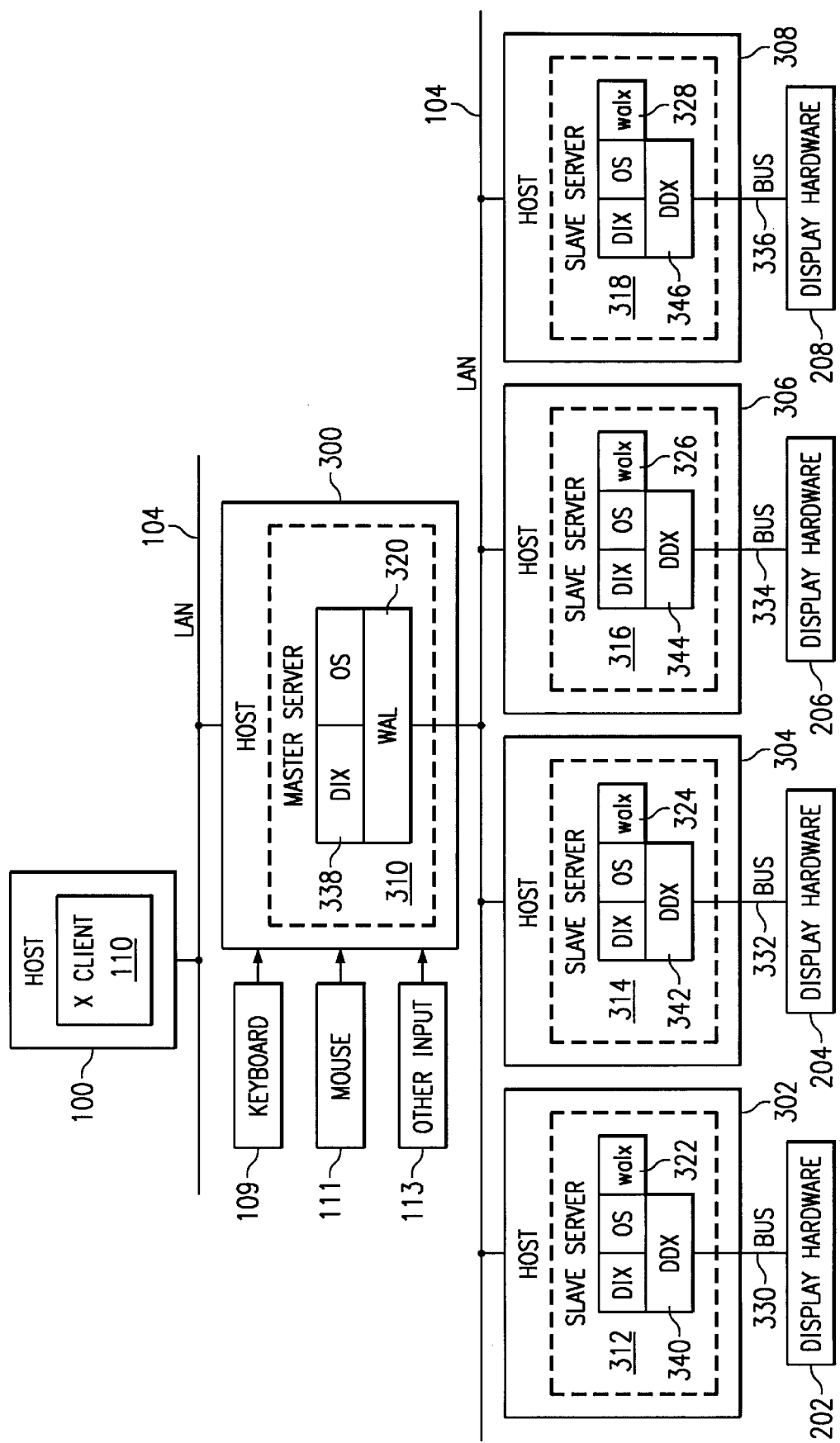
FIG. 3 is a logical schematic diagram illustrating a 2D single logical screen display substrate architecture using multiple remote computer systems.
Figure 4:
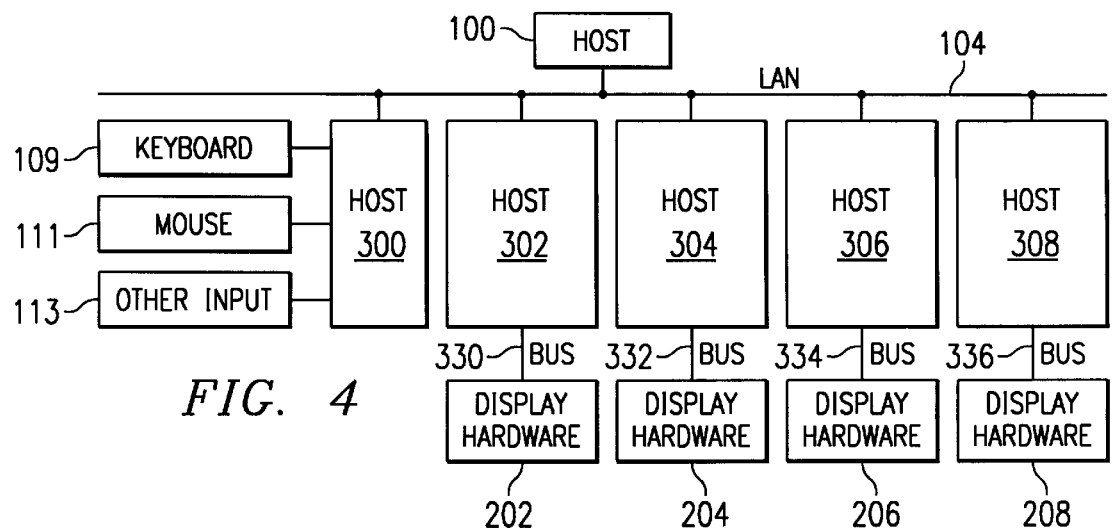
FIG. 4 is a physical schematic diagram of the single logical display substrate architecture of FIG. 3.

FIG. 3 is a logical schematic diagram illustrating the 2D portion of a single logical screen display according to a preferred embodiment of the invention. FIG. 4 is a physical schematic diagram illustrating the same single logical screen display system shown in FIG. 3. Host computer system 100 is connected to host computer systems 300–308 via connections to LAN 104. A master X server 310 runs on host 300, while slave X servers 312, 314, 316 and 318 run on hosts 302, 304, 306 and 308, respectively. Master X server 310 differs from conventional X server 112 in that DDX layer 124 is replaced with a new "WAL" layer 320. ("WAL" is an acronym created from the first letter of each of the surnames Walls, Allen and Lukasik.) Slave X servers 312, 314, 316 and 318 differ from conventional X server 112 only in that each slave X server implements a new extension to the X protocol. The new extension is called walX and is shown in the drawings at 322, 324, 326 and 328. Each of display hardware devices 202, 204, 206 and 208 may be conventional and would typically include, for example, a hardware accelerator coupled to a CRT-type monitor. Display hardware devices 202, 204, 206 and 208 are driven by X servers 312, 314, 316 and 318 using buses 330, 332, 334 and 336, respectively.

In a preferred embodiment, the functionality necessary for implementing master server 310 and slave servers 312–318 may be embodied in a single software product, which software product may be distributed using any available computer-readable storage/distribution media such as CDROMs, diskettes, tapes or networks. To create the configuration of FIG. 3, one copy of the software product would preferably be installed in each of hosts 300, 302, 304, 306 and 308. Then, each of the installed copies would be configured to behave either as a master server or a slave server as appropriate.

The arrangement of FIG. 3 is unique from a number of perspectives: First, WAL layer 320 works in concert with each of slave servers 312–318 to present the appearance of a conventional DDX layer to the master's DIX layer 338. Second, and more specifically, WAL layer 320 works in concert with walX extensions 322–328 so that, at various times, each slave DDX layer 340–346 may be made to appear to master 310 as though the slave DDX layer were the master's missing DDX layer. Third, WAL layer 320 presents the appearance of a client to each of slave servers 312–318.

A primary benefit provided by the inventive configuration of FIG. 3 is that, from the point of view of client 110, master server 310 and slave servers 312–318 look like a single server that commands a large, high-resolution display. Thus, 2D single logical screen capability is provided in a manner that is "transparent" to client 110 because client 110 need not assume any of the overhead associated with controlling each of display hardware devices 202–208 individually.

Another benefit provided by the configuration of FIG. 3 is that it overcomes the above-described limitation on the number of graphics cards and monitors that can be used to construct the composite screen. In the configuration of FIG. 3, multiple backplanes (one per host computer) may be used to provide the number of bus sockets necessary to create a very large composite screen.

1.1 Master Server

As mentioned above, master server 310 differs from conventional X server 112 in that a new WAL layer 320 replaces DDX layer 124.

1.1.1 WAL Layer

WAL layer 320 may best be described in terms of the data structures it creates and maintains. Persons having ordinary skill in the art will recognize that, in addition to implementing the routines necessary for creating and maintain those data structures, WAL layer 320 will also have access to a library that will enable WAL layer 320 to make use of walx extensions 322–328. (Such a library would be analogous, for example, to the "client side library" necessary to implement any extension to the X protocol.) The nature of that library will become apparent with reference to the detailed discussion provided below regarding the protocol requests that define the walX extension.

1.1.1.2 WAL Layer Data Structures

In a preferred embodiment, the following data structures are used in WAL layer 320.

WalMasterRec: WalMasterRec is the main data structure created and maintained by WAL layer 320. It may be declared in C as follows:

```
typedef struct __WalMasterRec
{
    Card16              nRows;
    Card16              nCols;
    Card16              nSlaves;
    WalSlavePtr         *pSlaves;
    WalVisualPtr        *pVisualInfo;
    WalCursorInfoPtr    cur;
    Int32               nCur;
    WalFontInfoPtr      fonI;
    Int32               nFon;
    WalCmapInfoPtr      pCmapInfo;
} WalMasterRec, *WalMasterPtr;
```

One WalMasterRec is maintained for each logical screen desired. Usually, only one logical screen will be desired; thus, usually only one WalMasterRec structure will be maintained. Nevertheless, if more than one logical screen is desired, an array of WalMasterRecs may be declared. The purpose of the WalMasterRec is to define the layout of the slave screens that will comprise the logical screen and to maintain informnation about each slave. The significance of each field in the WalMasterRec structure is as follows:

The nRows, nColumns and nSlaves fields specify the configuration of the physical display devices that make up the composite screen. For example, nRows=2, nColumns=2 and nSlaves=4 might be used to specify a 2×2 logical screen constructed using 4 CRT-type monitors, each monitor being driven by its own graphics card.

The *pSlaves field is an array of pointers. The pointers point to one WalSlaveRec data structure for each slave server. (The WalSlaveRec structure will be described below.)

The *pVisualInfo field is an array of pointers. The purpose of this array is to provide a mapping from the visuals of the master server to the visuals of each of the slave servers. Preferably, a set of visuals should be determined that is common to all of the slave servers, so that one homogenous set of visuals may be presented to the client.

The cur field is an array of WalCursorInfo recs, one for each cursor. Each of the cursor recs contains an array of pointers to a resource id for that cursor within each slave. The ncur field specifies the current number of cursors.

The font and nFon fields are like the cur and ncur fields in that the font field is an array of WalFontInfo recs, one for each font. Each of the font recs contains an array of pointers to a resource id for that font within each slave. The nFon field specifies the current number of fonts.

The pCmapInfo field is a pointer to the head of a linked list data structure called WalColorMapInfoStruct. In the linked list of the color map info structure, each element has three entries—the master colormap id, the slave color map id, and a pointer to the next element in the list. The purpose of the list is to map slave colormaps to master colormaps.

WalSlaveRec: The WalSlaveRec data structure may be declared in C as follows:

```
typedef struct__WalSlaveRec
{
    Char        *dpyName;
    Display     *dpy;
    Screen      *scr;
    XVisualInfo *vis;
    Int32       xOffset;
    Int32       yOffset;
    Card32      width;
    Card32      height;
} WalSlaveRec, *WalSLavePtr;
```

One WalSlaveRec data structure is maintained for each slave. The significance of each field in the WalSlaveRec data structure is as follows:

The *dpyName field is the display name field for the slave. The syntax used to name the displays is similar to that used in the X Window System, i.e., "hostname:0." These names identify a display that corresponds to the slave that this data structure is associated with. (The display may in theory be more than one physical monitor screen, but typically would be only one monitor screen.)

The *dpy, *scr and *vis fields are Xlib structures. Specifically, the *dpy field is the result of the XOpenDisplay call. The *vis field is the result of the XListVisualInfo call. And the *scr field is the result of an XScreenOfDisplay call. Note however that, in the configuration of the invention, master server 310 acts as a client for each of slave servers 312–318. Therefore, master server 310 makes these Xlib calls to the slave servers.

The xOffset and yOffset fields are the keys to causing different parts of the same window to appear properly on each of the physical screens in the SLS display. The information in these fields is used to offset every operation in the slave. While window creation uses this information directly, most rendering operations do not need it because the WindowRec structure produced during window creation will be based on the offset. The offset information in the WalSlaveRec structure is used, however, when rendering to the root window.

The width and height fields specify the width and height of the screen for the slave.

Master server 310 also maintains resources for each slave. For each type of resource, and for each slave, the following data structures are used to provide a mapping from the resource id on the master to the resource id on the slave.

WalWindowPrivRec: One of these structures exists for each window in the logical screen. The structure contains a mapping to the window id on each slave corresponding to the window. These structures are appended (as privates) to corresponding WindowRec structures. They may be declared as:

```
typedef struct__WalWindowPrivRec
{
    Window      *pSlave;
} WalWindowPrivRec,
```

WalGCPrivRec: A GC structure exists for each graphics context in master server 310 that was set up by client 110. Each GC structure has one of these structures appended to it (as a private) for the purpose of mapping the GC structure to a corresponding GC structure in each slave. They may be declared as:

```
typedef struct__WalGCPrivRec
{
    xlibGC      *pSlave;
    Int32       fastSlave;
} WalGCPrivRec, *WalGCPrivPtr;
```

The fastSlave field in this data structure is used to identify a slave that entirely contains a drawable on its screen. During the GC validation process, this field is either turned on by setting it to a slave id, or is turned off by setting it to another value. If the field is turned on and the validation is still intact, then draw commands for the pertinent drawable need only be sent to the "fast" slave.

WalPixmapPrivRec: For every pixmap resource on master server 310, this structure provides a mapping to the corresponding resource on each slave. It may be declared as:

```
typedef struct__WalPixmapPrivRec
{
    Pixmap      *pSlave;
} WalPixmapPrivRec, *WalPixmapPrivPtr;
```

WalColormapPrivRec: The nature and use of this data structure is analogous to the nature and use of the above-described WalGCPrivRec structure, except that the WalColormapPrivRec structure is used for colormaps. It may be declared as:

```
typedef struct__WalColormapPrivRec
{
    Colormap    *pSlave;
} WalCmapPrivRec, *WalCmapPrivPtr;
```

WalVisualStruct: This is the structure pointed to by the *pVisualInfo field of the WalMasterRec. It may be declared as:

```
typedef struct__WalVisualStruct
{
    VisualID    pMaster;
    Visual      **pSlave;
} WalVisualRec, *WalVisualPtr.
```

WalColormapInfoStruct: This is the above-described structure pointed to by the last field in the WalMasterRec structure. It may be declared as:

```
typedef struct __WalColormapInfoStruct
{
    Colormap    pMaster;
    Colormap    pSlave;
    struct __WalColormapInfoStruct *next
} WalCmapInfoRec, *WalCmapInfoPtr;
```

WalBufferIDStruct: This structure is used during double buffering. There are potentially many back buffers for every window; so, every window that is to be double-buffered would have at least one of these structures associated with it. (The structure always corresponds to the back buffer.) It provides a mapping to corresponding resources in each slave—resources, that is, that correspond to a particular back buffer for a particular window. Preferably, it is a private. It may be declared as:

```
typedef struct __WalBufferIDStruct
{
    XID    pMaster;
    XID    *pSlave;
} WalBufferIDRec, *WalBufferIDPtr;
```

WalCursorInfoStruct: This is the above-described structure pointed to by the cur field of the WalMasterRec structure. It may be declared as:

```
typedef struct __WalCursorInfoStruct
{
    Card32    pMaster;
    XIF       *pSlave;
} WalCursorInfoRec, *WalCursorInfoPtr;
```

WalFontInfoStruct: This is the above-described structure pointed to by the fon field of the WalMasterRec structure. It may be declared as:

```
typedef struct __WalCursorInfoStruct
{
    Card32       pMaster;
    XFontStruct  **pSlave;
} WalFontInfoRec, *WalFontInfoPtr;
```

1.2 Slave Server

As mentioned above, slave servers 312, 314, 316 and 318 differ from conventional X server 112 in that each of these slave servers implements a new extension to the X protocol. The new extension is called walX.

1.2.1 WALX extension

Referring once again to FIG. 1 it can be seen that, in a conventional X Window System implementation, protocol activity occurs only between client 110 and server 112. There is no concept of a master server and a slave server. And the interface between DIX layer 120 and DDX layer 124 within server 112 is a direct one. In other words, routines in DIX layer 120 directly invoke routines in DDX layer 124. (They are part of the same process.) For example, a conventional X server implements functions like Position-Window as a DDX-layer routine that is called by the DIX layer in response to the X server receiving a protocol request like MoveWindow from the client. There is no facility in a conventional X server to receive a command like Position-Window as protocol from any higher level entity like a client or another server.

Figure 1:
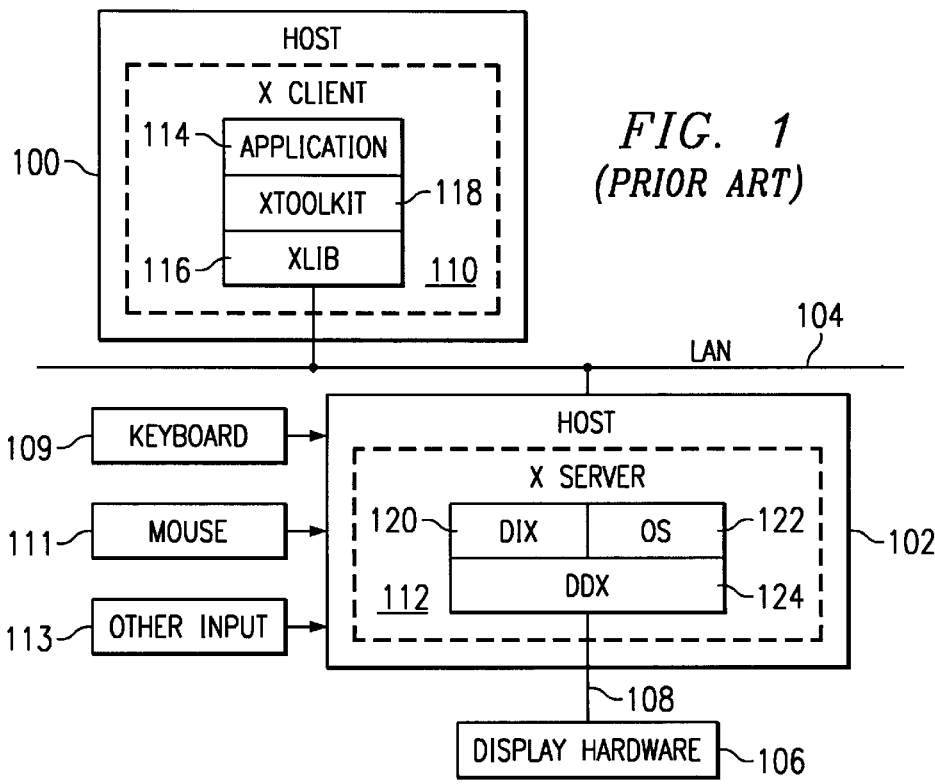
FIG. 1 is a schematic diagram illustrating a single-screen networked X Window System configuration according to the prior art.
Figure 2:
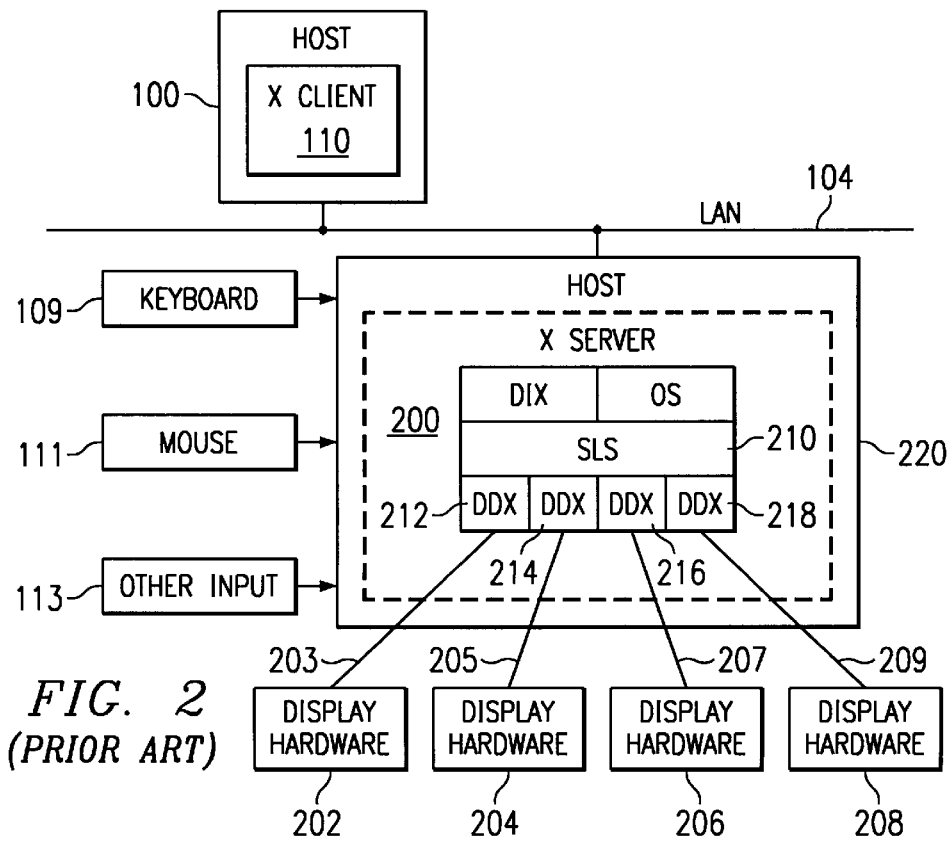
FIG. 2 is a schematic diagram illustrating a single logical screen networked X Window System configuration that uses one remote computer system according to the prior art.

Contrasting the conventional configuration of FIG. 1 with the inventive configuration of FIG. 3, a number of differences become immediately apparent. First, in the configuration of FIG. 3, there are two different types of servers (a master and a slave). Second, there is a LAN connection between master server 310 and slave servers 312–318. Third, as was mentioned above, DIX layer 338 in master server 310 needs to be able to communicate with and invoke routines in DDX layers 340–346 of slave servers 312–318 in order to create a single logical screen display. Therefore, the new walX protocol was developed for two main purposes: First, it implements a DIX/DDX interface in protocol between DIX layer 338 of master server 310 and DDX layers 340–346 of slave servers 312–318. (In theory, the entire DIX/DDX interface could be implemented in protocol; but, in a preferred embodiment, it was deemed necessary to implement only a subset of the DIX/DDX interface, as will be discussed below.) Second, it implements a number of new requests that do not correspond to preexisting DIX/DDX interface functions.

By way of background, extensions to the X protocol are, in general, server modifications that cause the X server to respond to a protocol that differs from the core X protocol. An extension may augment the core protocol with additional requests, replies, errors or events, or an extension may simply change the behavior of existing requests, replies, errors or events that are defined by the core protocol. It will be understood by those having ordinary skill in the art that, although an extension is implemented by adding functionality to the server, a library that corresponds to the extension must usually be placed on the client side of the LAN connection in order for the client to be able to make use of the functions provided by the extension in the server. In the case of the inventive configuration of FIG. 3, such an extension library would be placed within master server 310 so that it can utilize the functions provided by waiX extensions 322–328 within slave servers 312–318. For more detailed information on how extensions to the X protocol are implemented, see Israel and Fortune, supra.

The waIX extension defines a number of new protocol requests and replies that will now be discussed in detail. The walX extension does not define any new events or errors. The requests/replies defined by the walX extension can be described in terms of the following functional groups. (Normally, each of the request names in the discussion that follows would be preceded by the letters "walx" in order to identify them as belonging to the extension protocol. The prefix letters have been suppressed in this discussion for simplicity.)

Query Version: This request/reply returns the version number of the extension.

SetSlave: This request is used during initialization to tell a target server that it will function as a slave instead of a regular X server. When the target server is told this, the target server enables the walX extension. The new slave server does not need to know where it is in the array of screens that make up the logical display; it just needs to know that it is a slave. The new slave server also sets a new function pointer to change the routine for "deliver events." (Event handling differs in slave servers 312–318 relative to a conventional X server, as will be discussed in detail below.)

Window Requests: WalX implements a number of requests that relate to windows. These functions are analogous to existing DIX/DDX interface functions:

Move, Resize: These requests deal with the x,y location and the width and height of windows. They are similar to routines that exist in the X protocol, but they are pared down for efficiency because, in the inventive configuration of FIG. 3, master 310 knows the information that the X protocol version would normally have to go and figure out.

ReflectStackChange, CirculateWindow: These requests relate to rotating the order of windows in the stacking order.

PaintWindowBorder, ClearToBackground: These requests are painting and filling operations for which functions are not provided in the X protocol.

Rendering Requests: This group of requests includes CreateGC, ValidateGC, CopyClip, DestroyClip, PutImage, CopyArea and CopyPlane. They are analogous to existing DIX/DDX interface functions.

Cursor Requests: This group of requests includes ShowCursor, HideCursor, DisplayCursor, UnrealizeCursor, SetCursorPosition, SetCursorID, GetCursorID, CursorOff, GrabScreen, UngrabScreen and CreateCursor. They are analogous to existing DIX/DDX interface functions.

Colormap Requests: This group of requests includes one request that is analogous to an existing DIX/DDX interface function, and adds two new ones.

ResolveColor is analogous to the existing DIX/DDX interface function.

GetCmapEntryRefCnt: This new request retrieves the current value of the reference count for an individual entry in a particular colormap on a particular slave.

SetCmapEntryRefCnt: This new request sets the value of the reference count for an individual entry in a particular colormap on a particular slave.

Event Request: This group of requests includes EventAnyPending, EvenGetExpose, EventGetGraphicsExpose, EventGetColormap, and EventFlushColormap. Their purpose will be better understood with reference to the more detailed discussion of event handling provided below in the section titled "Functional Behavior." Briefly, though, in the inventive configuration of FIG. 3, events are cached in each slave server as they occur. (This is to be contrasted with a conventional X Window System configuration, in which events are communicated immediately from the slave to the client as they occur.) Master server 310 periodically polls each slave in order to become aware of events. Master 310 then combines the separate events from each slave into one homogeneous event that would be appropriate for client 110 to receive, and then sends it to client 110.

The EventAnyPending request enables the master to query the slaves individually to determine if any events have occurred in a particular slave. The slaves respond with a mask that indicates occurrences for each type of event. Upon decoding these responses, the master can then issue any of the EventGetExpose, EventGetGraphicsExpose and EventGetColormap requests to the appropriate servers in order to retrieve identified events from those servers. Once a "get" request is issued to the slave, the event is cleared from the event cache on the slave. The EventFlushColormap request is provided because a colormap event on any slave would map to the same colormap within the master; thus, once the colormap event has been retrieved from one slave server, the corresponding colormap events may be "flushed" from the caches on each of the other slave servers, since they would contain no new information as far as the master is concerned.

Mscellaneous Requests: This group of requests includes GetSpans, BitmapToRegion, ModifyPixmapHeader and SetShapeRegion. They are analogous to existing DIX/DDX interface functions.

2 Functional Behavior of the 2D SLS Substrate Architecture

To following discussion of functional behavior will provide a better understanding of the preferred methods for using the above-described data structures and protocol extension requests for the purpose of implementing 2D single logical screen functionality using multiple remote computer systems.

2.1 Slave Management

In addition to creating and maintaining the data structures discussed above, master server 310 communicates with each of slave servers 312–318 in order to perform such operations as resource management, rendering, input processing and event handling. Because each of slave servers 312–318 is a fully functional X server with the additional capabilities of the walX extension, master server 310 may use conventional X protocol as well as waiX protocol when communicating with slave servers 312–318 to accomplish these tasks.

2.1.2 Resource Management

In a preferred embodiment, two different methods may be used for resource management: privates-based resource management and list-based resource management.

2.1.2.1 Privates-Based Resource Management

Figure 5:
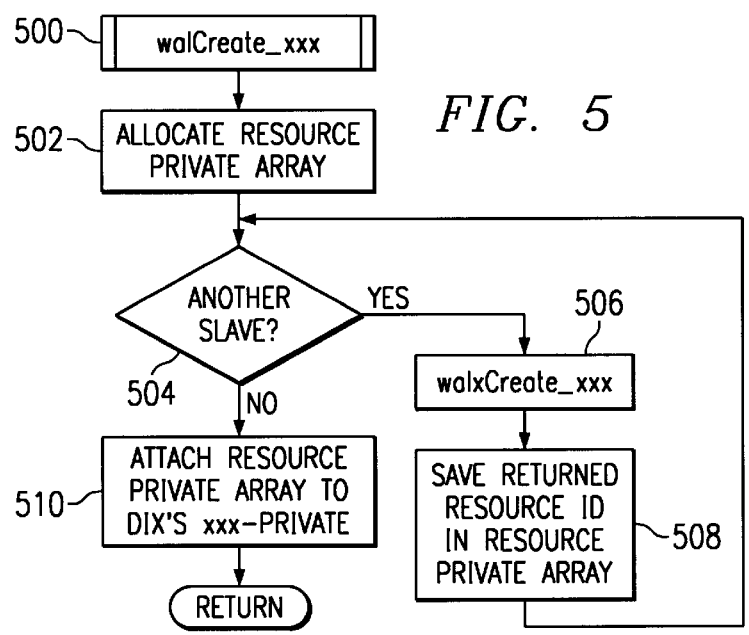
FIG. 5 is a flow diagram illustrating a privates-based method for performing resource management within the master server of FIG. 3.
Figure 6:
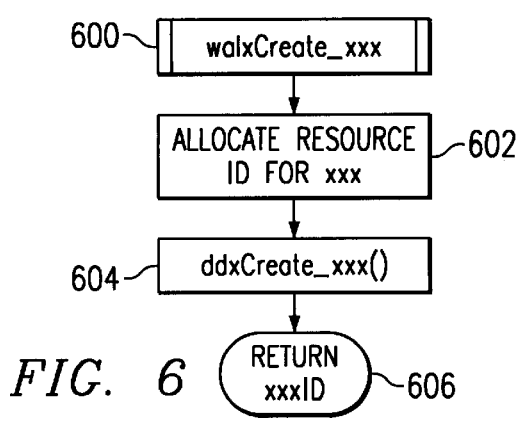
FIG. 6 is a flow diagram illustrating activity that occurs within the slave servers of FIG. 3 responsive to the master server activity depicted in FIG. 5.

FIGS. 5 and 6 illustrate a preferred method for creating resources using privates. FIG. 5 illustrates the method steps that occur within master server 310, and FIG. 6 illustrates the method steps that occur within each of slave servers 312–318. In step 500, master server 310 calls a routine called walCreate_xxx to create a resource. (The three x's are used here in the name of walCreate to mean that the actual command names could differ depending on what type of resource is going to be created.) In step 502, master server 310 allocates a resource private array. Then, in steps 504, 506 and 508, master server 310 loops through each of slave servers 312–318 individually, invoidng the walxCreate_xxx protocol request in each case in step 506. In response to the walxCreate_xxx protocol requests, each slave will return a resource ID. In step 508, master server 310 saves the returned resource ID in the resource private array that was allocated during step 502. After this process has been completed for each slave, master server 310 attaches the resource private array to the xxx-private structure belonging to DIX layer 338.

The steps in FIG. 6 illustrate what happens in a slave when master server 310 sends the walxCreate_xxx protocol request in step 506. In step 600, the protocol request is received in the slave. In step 602, the slave server allocates a resource ID for xxx. Then, in step 604, the slave server calls its DDX routine for creating the resource, ddxCreate_xxx(). Finally, in step 606, the slave returns the xxxID to master server 310.

2.1.2.2 List-Based Resource Management

Figure 7:
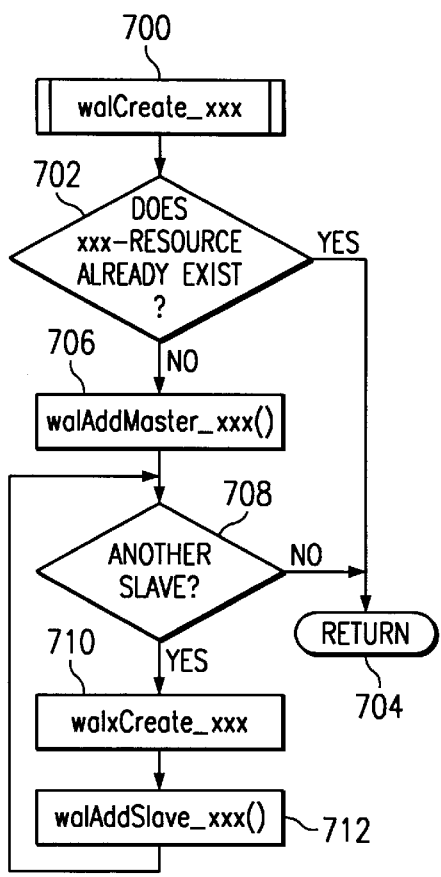
FIG. 7 is a flow diagram illustrating a list-based method for performing resource management within the master server of FIG. 3.

List-based resource management is illustrated in FIG. 7. In step 700, master server 310 calls the waCreate_xxx routine to create the resource. Step 702 checks to see if the resource already exists. If not, then master server 310 invokes a walAddMaster() routine in step 706 to add the new resource to its master list. In steps 708, 710 and 712, master server 310 loops through each of the slaves, individually commanding them to create the resource in step 710 and adding the returned resource ID to the master resource list in step 712.

2.1.3 Rendering

Figure 8:
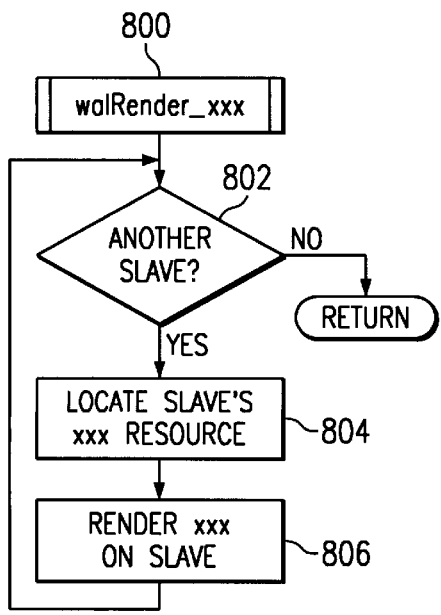
FIG. 8 is a flow diagram illustrating a method for performing rendering operations in the configuration of FIG. 3.

The preferred method for doing rendering operations using the configuration of FIG. 3 is illustrated in FIG. 8. In step 800, master server 310 calls a walRender_xxx routine to draw something. The operation is executed in steps 802, 804 and 806 by having master server 310 loop through each slave and performs steps 804 and 806 on each slave. In step 804, master server 310 locates the slave's xxx resource. In step 806, it performs the rendering operation on the slave using the resource information determined in step 804. Once this has been done for each slave, the operation is complete.

2.1.4 Input Processing

Figure 9:
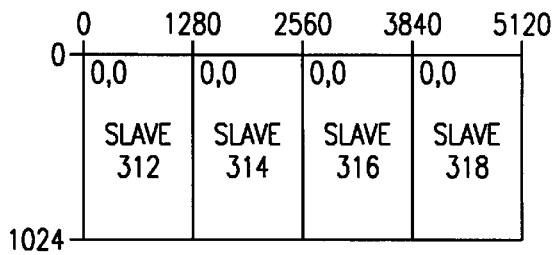
FIG. 9 is a representation of a single logical screen comprised of four physical screens.

The preferred method for doing input processing using the configuration of FIG. 3 may best be explained with a few cursor positioning examples. FIG. 9 illustrates a logical screen composed of four individual screens in a 4×1 configuration. Each of the separate screens corresponds to and is controlled by one of slave servers 312–318, as shown. Each individual screen has a resolution of 1280×1024; thus, the resolution of the logical screen in this configuration is 5120×1024. Logical screen coordinates range from 0 to 5120 in x and from 0 to 1024 in y. Physical screen coordinates for each screen range from 0 to 1280 in x and from 0 to 1024 in y. The 0,0 origin for the physical coordinate system of each screen is shown in the upper left hand corner of each screen. The xOffset and yOffset information for each screen stored in the WalSlaveRec data structure for each slave is as shown in Table 1.

TABLE 1

| Slave Server | xOffset, yOffset | x'min | x'max | y'min | y'max |
|---|---|---|---|---|---|
| 312 | 0, 0 | 0 | 1295 | 0 | 1024 |
| 314 | 1280, 0 | −15 | 1295 | 0 | 1024 |
| 316 | 2560, 0 | −15 | 1295 | 0 | 1024 |
| 316 | 3840, 0 | −15 | 1280 | 0 | 1024 |

Figure 10:
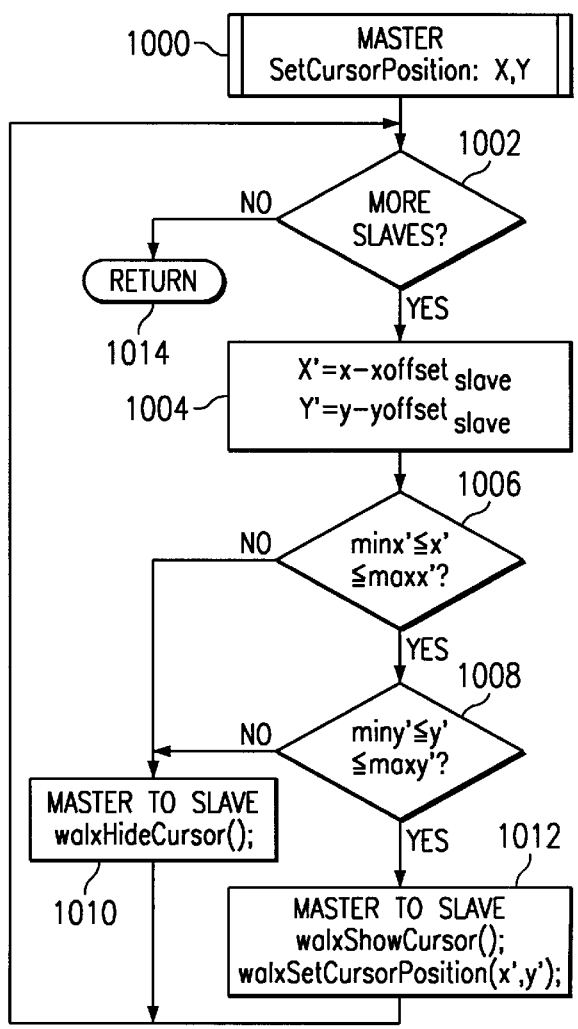
FIG. 10 is a flow diagram illustrating a method for setting a cursor position on the single logical screen of FIG. 9.

Assume that mouse movement has been detected within server 310. Assume further that the appropriate response is to reposition the cursor to logical screen coordinates X,Y. FIG. 10 illustrates the steps that master 310 will perform in order to accomplish this. In steps 1002–1012, master 310 loops through each slave and sends an appropriate request to each slave in order to implement the cursor movement on the logical screen. For each slave, master 310 accesses the WalSlaveRec data structure for that slave in step 1004 and subtracts the xOffset and yOffset stored there from the new logical screen coordinates for the cursor. Then, in steps 1006 and 1008, master 310 compares the post-subtraction cursor coordinates with predetermined minimum and maximum values in x and y for that slave. For example, for the x dimension, a post-subtraction minimum value (x'min) of −15 and a post-subtraction maximum value (x'max) of 1295 might be predetermined in order to provide some overlap between adjacent displays. (x'min for slave 312 and x'max for slave 318 would be 0 and 1280, respectively, because they are at the ends of the logical display.) With a 4×1 screen configuration as shown in the example, appropriate post-subtraction minimum and maximum values for the y dimension (y'min and y'max) would be 0 and 1024; but for configurations containing more than one row of screens, y-dimension overlaps of +/−15 or so may be designated as appropriate to provide overlap. If it is determined in steps 1006 and 1008 that either of the post-subtraction x and y values do not fall within the corresponding predetermined minimum and maximum values for that slave, then master 310 will use protocol to command the slave to hide its cursor in step 1010. Otherwise, master 310 will use protocol to command the slave to show its cursor at the post-subtraction x,y coordinates in step 1012. Once this process has been completed for each slave, the routine returns at step 1014.

FIGS. 11A–C illustrate the results for three different hypothetical cases. In the example of FIG. 11A, at step 1100A, a new cursor position is needed at logical screen coordinates 100,100. Because xOffset and yOffset for slave 312 are 0,0, the result of the subtraction operation for slave 312 yields x'=100, y'=100. These values fall within x'min=0, x'max=1295 and y'min=0, y'max=1024. However, the subtraction operation for each of slaves 314–318 would yield numbers well outside the minimum and maximum ranges for x' and y' for those slaves. Therefore, in step 1102A, master 310 commands slave 312 to show the cursor at 100,100. But in steps 1104A–1108A, master 310 commands slaves 314–318 to hide their cursors.

In the example of FIG. 11B, at step 100B, a new cursor position is needed at logical screen coordinates 1400,100. Because xOffset and yOffset for slave 312 are 0,0, the result of the subtraction operation for slave 312 yields x'=1400, y'=100. The x' value falls outside of the range of x'min and x'max for slave server 312. Therefore, in step 1102B, master 310 commands slave server 312 to hide its cursor. For slave server 314, however, x'=120 and y'=100. These values fall within the min and max ranges for both x' and y' on slave server 314. Therefore, in step 1104B, master 310 commands slave server 314 to show the cursor at 120,100. The subtraction operation for slave servers 316 and 318 yield x' values that do not fall within the x'min and x'max ranges for those servers. Therefore, in steps 1106B and 1108B, master server 310 commands slave servers 316 and 318 to hide their cursors. The result is that the cursor will appear on slave 314's monitor only.

In the example of FIG. 11C, the new cursor position splits the cursor between two monitors. In step 1100C, a new cursor position is needed at logical screen coordinates 1270,100. Assume the cursor width is approximately 20 pixels. This means that the left-most portion of the cursor should appear on the monitor controlled by slave 312, and the right-most portion should appear on the monitor controlled by slave 314. The subtraction operation for slave 312 yields x'=1270, y'=100. These values do fall within the min and max ranges for x' and y' for slave 312. Therefore, in step 1102C, master 310 commands slave 312 to show the cursor at 1270,100. The subtraction operation for slave 314 yields x'=−10, y'=100. These values fall within the min and max ranges for x' and y' for slave 314. Therefore, in step 1104C, master 310 commands slave 314 to show the cursor at −10,100. The subtraction operation for slaves 316 and 318 yield x' values that fall outside the min and max range for x' for those slaves. Therefore, in steps 1106C and 1108C, master server 310 commands slaves 316 and 318 to hide their cursors.

2.2 Special Cases

A number of additional problems were solved uniquely in the process of creating the above-described 2D single logical screen substrate architecture. Those solutions are described in the remaining sections of this part 2.

2.2.1 Event Handling

The preferred technique used for DDX-level event handling in the configuration of FIG. 3 is a unique one and will now be described in more detail with reference to FIGS. 12–15.

As discussed above, when the walxSetSlave command was issued to each of slave servers 312–318, the slave servers installed a new function pointer in their "deliver events" routines such that events would now be stored in memory rather than sent immediately to a client or other entity. FIG. 12 illustrates a preferred storage scheme for implementing this functionality. In each slave server, an event cache 1200 is created. In event cache 1200, one queue structure is created for each type of event that will be of interest. The queue structures may be implemented in any way suitable that will maintain the sequential order of the events within that queue. (For example, a FIFO arrangement may be created for each queue by using RAM memory with appropriate pointers.) In a preferred embodiment, three such queues are created in event cache 1200: an expose event queue 1202, a graphics expose event queue 1204 and a colormap event queue 1206.

To better illustrate how event cache 1200 is used in conjunction with the above-described walx protocol requests that relate to event handling, two examples will now be explored.

2.2.1.1 Expose Events Example

Figure 13:
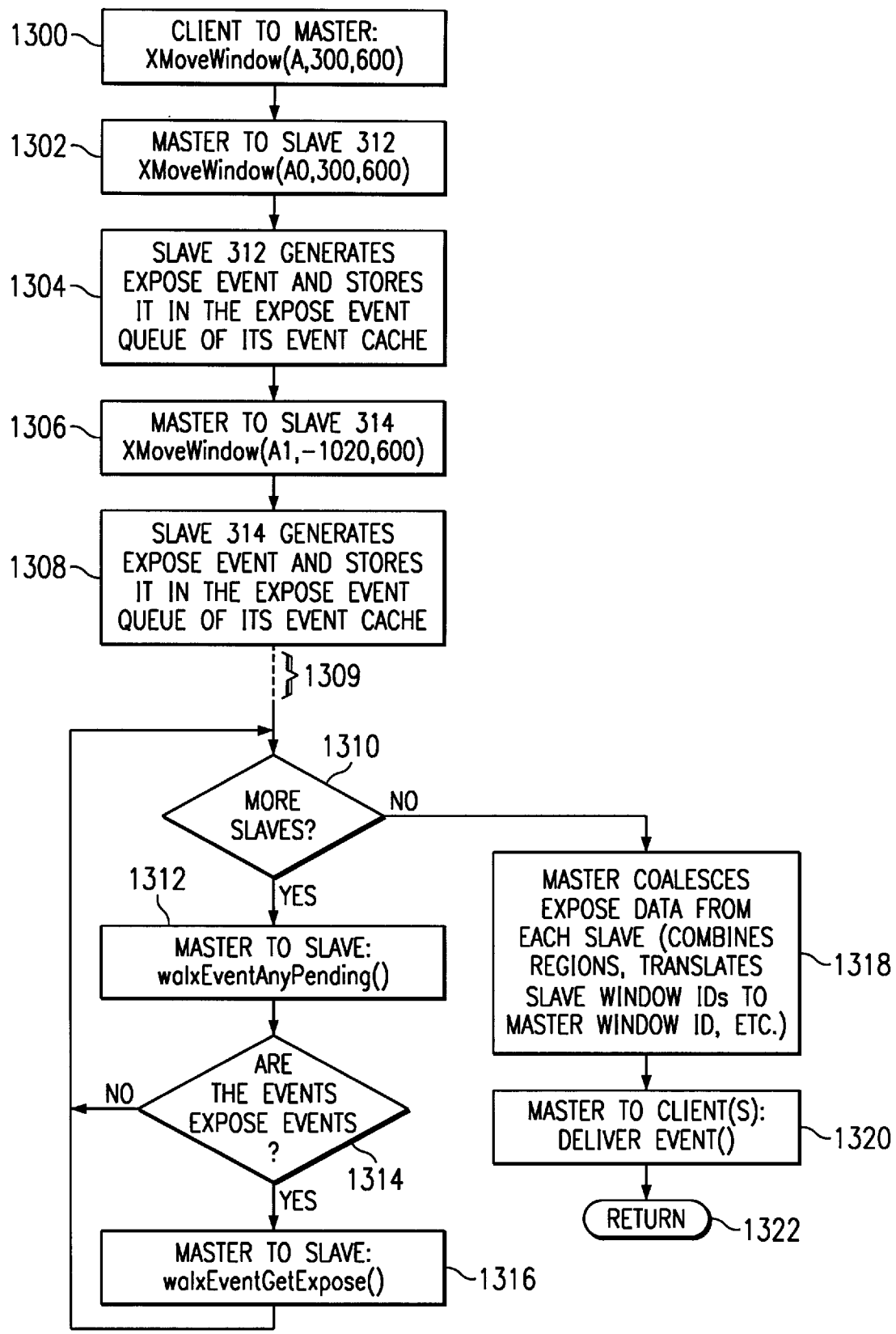
FIG. 13 is a flow diagram illustrating a preferred method for expose event caching and expose event handling within the configuration of FIG. 3.

Referring now to FIG. 13, assume in step 1300 that client 110 asks master 310 to move the window whose master ID is "A." In response to this request, master 310 determines the corresponding window IDs on each slave, as well as the appropriate offsets for each slave, and issues a specially tailored XMoveWindow command to each slave. For example, in step 1302, master 310 issues the command XMoveWindow(A0,300,600) to slave 312, wherein A0 is the window ID on slave 312 that corresponds to the master window ID A, and 300,600 are the offset versions of the coordinates passed from client 110 to master 310. Then, in step 1304, slave 312 will generate an expose event because the window has been moved. Instead of sending the expose event to a client immediately, as would be the case in a conventional X Window System, slave 312 instead stores the expose event in the expose event queue within its event cache.

Similarly, in step 1306, master 310 issues an XMoveWindow(A1,-1020,600) command to slave 314, wherein A1 is the window ID on slave 314 that corresponds to the master window ID A, and -1020,600 are the offset versions of the coordinates passed from client 110 to master 310. Then, in step 1308, slave 314 generates an expose event because the window has been moved. It stores the expose event in the expose event queue within its event cache. The ellipsis shown in the drawing at 1309 indicates that this procedure will be repeated for each slave in the logical screen arrangement. Once this has been done for each slave, master 310 will then poll the slaves to collect the events from each of them.

This polling method is represented by steps 1310–1320 in the drawing. For each slave, master 310 issues a walxEventAnyPending() request in step 1312. The slave will respond to master 310 with a mask. In the example embodiment shown, the mask will be a three-bit field with one bit indicating whether or not the slave has any expose events in its cache, another bit indicating the existence of any graphics expose events, and the third bit indicating the existence of any colormap events. In step 1314, master 310 parses this mask to see if the expose event bit is set. If not, then execution resumes with step 1310. Otherwise, master 310 issues a walxEventGetExpose() request to the slave in step 1316. In response, the slave sends to the master all of the information necessary to define all of the expose events in its queue. (This operation also has the effect of clearing the expose events queue within that slave.)

Once all of the slaves have been polled in this manner, in step 1318 master 310 coalesces the information it has received from the slaves. For example, the regions specified in each slave event must be combined, and any window IDs specified by the slaves must be translated to a master window ID. Once this has been done, in step 1320 master 310 delivers the coalesced event to the client (including any other interested clients).

The method for handling graphics expose events is analogous to the just-described method for handling expose events.

2.2.1.2 Colormap Events Example

Figures 14, 15:
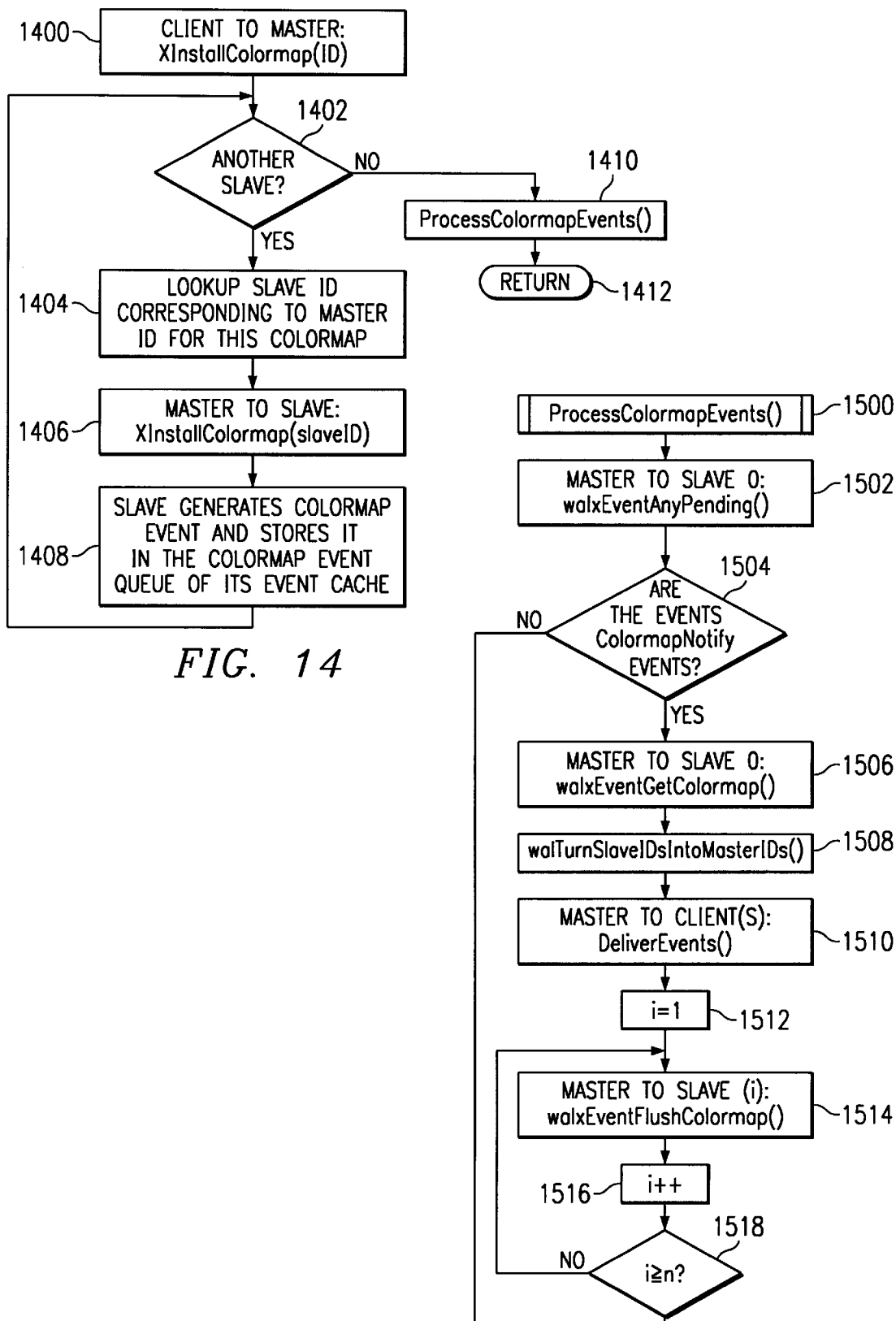
FIGS. 14–15 are flow diagrams illustrating a preferred method for colormap event caching and colormap event handling within the configuration of FIG. 3.

In the case of expose events, information is needed from each slave in order to form a properly coalesced master event that can be transmitted to the client. In the case of colormap events, however, the situation is simpler. For each colormap resource in the master, a set of slave colormap IDs will be associated with it. But if a colormap event occurs in the slaves, the corresponding colormap ID from any one slave will be sufficient to determine the corresponding master colormap ID for transmitting to the client. FIGS. 14 and 15 illustrate this in more detail.

In FIG. 14, assume that colormaps have been created in master 310 and that, for each colormap in the master, a corresponding colormap has been created in each of slaves 312–318. Then, at step 1400, assume client 110 sends a protocol request to master 310 to install one of the existing colormaps. In steps, 1402–1408, master 310 loops through each slave installing the corresponding colormaps. In step 1404, master 310 determines the slave colormap ID that corresponds to the master colormap ID. In step 1406, master 310 issues an XInstallColormap request to the slave, using the proper slave ID for the colomap. Then, in step 1408, the slave generates a colormap event because its colormap will have been changed. It stores this event in the colormap event queue of its event cache. Once this process has been completed for each slave, master 310 will preform a ProcessColormapEvents() routine in step 1410.

FIG. 15 illustrates the ProcessColormapEvents() routine in more detail. In step 1502, master 310 interrogates slave 312 with a walxEventAnyPending() request. In response, slave 312 transmits the above-discussed mask to master 310. In step 1504, master 310 parses the mask to determine if there are any colormap events pending in slave 312. If not, the routine returns at step 1520. But if so, in step 1506 master 310 retrieves all of the colormap events from slave 312's colormap event queue by issuing the walxEventGetColormap() request to slave 312. (As in the expose events case, the walxEventGetColormap() request has the effect of clearing the colormap event queue in that slave.) In step 1508, master 310 determines which master colormap ID corresponds to the slave colormap ID for each colomap expose event. In step 1510, master 310 delivers the expose events to client 110 (including any other interested clients), using the proper master colormap IDs. Then, in steps 1512–1518, master 310 issues a walxEventFlushColormap() request to each of slaves 314–318 in order to clear the colormap event queues in each of those slaves.

2.2.2 Reclamation of Protocol-Level Parameters for DIX/DDX Interface Entrypoints Another problem that was solved uniquely in creating the 2D single logical screen substrate architecture relates to implementing certain DIX/DDX interface entrypoints with protocol. As discussed above, certain DIX/DDX interface entrypoints were implemented as protocol requests. For example, the DIX/DDX entrypoint "CreateGC" has been turned into a series of XCreateGC() calls to each of the slave servers. This was done because, in the configuration of FIG.

3, there is no actual DDX layer in master 310; but the DIX layer of master 310 needs to be able to access DDX-layer functionality within each of slaves 312–318. The problem with doing this, however, is that once an X protocol-level request gets to the DIX/DDX interface level, it has changed from its original form. For example, XCreateGC() requires a "drawable" as one of its arguments. But once the request gets to the DDC/DDX interface, the drawable parameter has been removed from the parameter list. To construct the correct X protocol-level call, then, for each of the slaves, master 310 frequently must do extra work to "reclaim" the missing information.

2.2.2.1 Create Window Example

In some cases, it is possible to reconstruct the X protocol-level information and to create an appropriate X protocol request between master 310 and each of slaves 312–318. An example of this case is XCreateWindow. Table 2 illustrates how this X protocol request may be reconstructed at the DIX/WAL level within master 310 and sent to the slaves as a group of related X protocol requests.

TABLE 2

| Request/Procedure/Function/Routine | Process | Level |
|---|---|---|
| From client 110 to master 310: XCreateWindow(masterhost:0,100,50, 2000,1400) | Client 110 | Xlib |
| ProcCreateWindow(100,50,2000,1400) | Master 310 | DIX |
| CreateWindow(100,50,2000,1400) | Master 310 | DIX |
| walCreateWindow(100,50,2000,1400) | Master 310 | WAL |
| From master 310 to slave 312: XCreateWindow(slave312host:0,100,50, 2000,1400) | Master 310 | WAL |
| ProcCreateWindow(100,50,2000,1400) | Slave 312 | DIX |
| CreateWindow(100,50,2000,1400) | Slave 312 | DIX |
| suCreateWindow(100,50,2000,1400) | Slave 312 | DDX |
| From master 310 to slave 314: XCreateWindow(slave314host:0,−1180,50, 2000,1400) | Master 310 | WAL |
| ProcCreateWindow(−1180,50,2000,1400) | Slave 314 | DIX |
| CreateWindow(−1180,50,2000,1400) | Slave 314 | DIX |
| suCreateWindow(−1180,50, 2000,1400) | Slave 314 | DDX |
| From master 310 to slave 316: XCreateWindow(slave316host:0,100,−974, 2000,1400) | Master 310 | WAL |
| ProcCreateWindow(100,−974,2000,1400) | Slave 316 | DIX |
| CreateWindow(100,−974,2000,1400) | Slave 316 | DIX |
| suCreateWindow(100,−974,2000,1400) | Slave 316 | DDX |
| From master 310 to slave 318: XCreateWindow(slave318host:0,−1180,−974, 2000,1400) | Master 310 | WAL |
| ProcCreateWindow(−1180,−974,2000,1400) | Slave 318 | DIX |
| CreateWindow(−1180,−974,2000,1400) | Slave 318 | DIX |
| suCreateWindow(−1180,−974, 2000,1400) | Slave 318 | DDX |
| miCreateWindow(100,50,2000,1400) | Master 310 | WAL |

2.2.2.2 Create Cursor Example

In other cases, not all X protocol-level parameters are present at the DIX/DDX level. In those cases, walx extension protocol may be used to pass the missing information to the slaves.

Cursor creation illustrates this point. Ordinarily during cursor creation, the DDX layer expects to be able to use pointers to access a cursor data bitmap and a cursor mask bitmap stored in a DIX-layer data structure. But in the configuration of FIG. 3, this would not be possible because the slave DDX layer does not reside on the same server (or in the same process) as the master's DIX layer data structures. Therefore, a walxCreateCursor command is used to pass the cursor data and cursor mask to the slaves.

Figure 16:
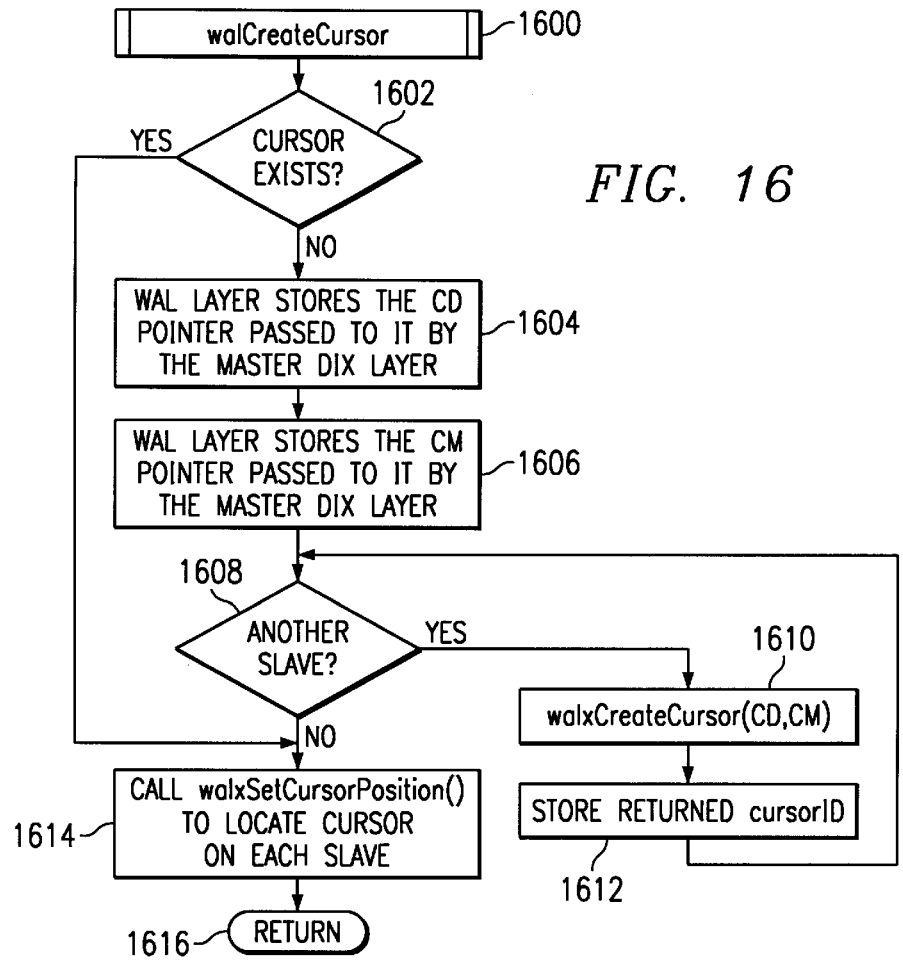
FIGS. 16–17 are flow diagrams illustrating a preferred method for enabling DIX/DDX interface functions to be performed between the DIX layer of the master server of FIG. 3 and the DDX layer of one of the slave servers of FIG. 3.

FIG. 16 illustrates the routine performed within master 310 during cursor creation. If it is determined in step 1602 that the cursor already exists, then master 310 simply uses the walxSetCursorPosition() request with each of the slaves in step 1614 to locate the cursor appropriately on the logical screen. (See the above discussion on cursor positioning.) But if it is determined in step 1602 that the cursor does not yet exist, then in step 1604 master 310 saves the cursor data bitmap pointer that was passed to it by DIX layer 338. Similarly, in step 1606, master 310 saves the cursor mask bitmap pointer that was passed to it by DIX layer 338. In steps 1608–1612, master 310 loops through the slaves issuing the walxCreateCursor command (step 1610), saving the returned cursorIDs for each slave, and associating them with the master's cursor ID (step 1612). Each time master 310 performs step 1610, it uses the pointers saved during steps 1604 and 1606 to access the cursor data bitmap and cursor mask bitmap in DIX layer 338, and it sends the cursor data bitmap ("CD") and the cursor mask bitmap ("CM") to the slave.

Figure 17:
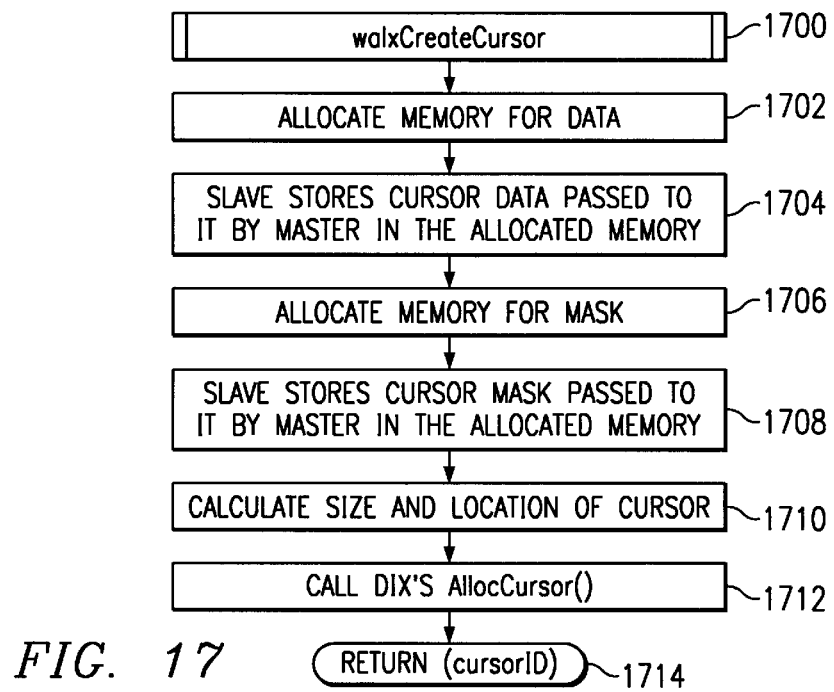

FIG. 17 illustrates in detail the routine performed by each slave in response to the walxCreateCursor request. In step 1702, the slave allocates memory for the cursor data bitmap. In step 1704, the slave copies the cursor data bitmap passed to it by master 310 into the memory allocated in step 1702. In step 1706, the slave allocates memory for the cursor mask bitmap. In step 1708, the slave copies the cursor mask bitmap passed to it by master 310 into the memory allocated in step 1706. In step 1710, the slave calculates the size and location of the cursor. In step 1712, the slave calls its DIX routine AllocCursor(). Finally, in step 1714, the slave returns a cursor ID to master 310.

3 3D Graphics in a Single Logical Screen Display System Using Multiple Remote Computer Systems Having described the 2D single logical screen substrate architecture in detail, it is now possible to describe in detail a preferred embodiment of the inventive 3D single logical screen system that uses multiple remote computers.

3.1 Background

By way of background, OpenGL is a standard application programmer's interface ("API") to hardware that accelerates 3D graphics operations. Although OpenGL was designed to be window system independent, it is intended to be used with window systems such as the X Window System. In order that OpenGL may be used in an X Window System environment, an extension to the X Window System has been developed called GLX. For more complete information on the GLX extension to the X Window System and on how OpenGL can be integrated with the X Window System, see for example Mark K. Kilgard, *OpenGL Programming for the X Window System* (Addison-Wesley Developers Press 1996).

Figure 18:
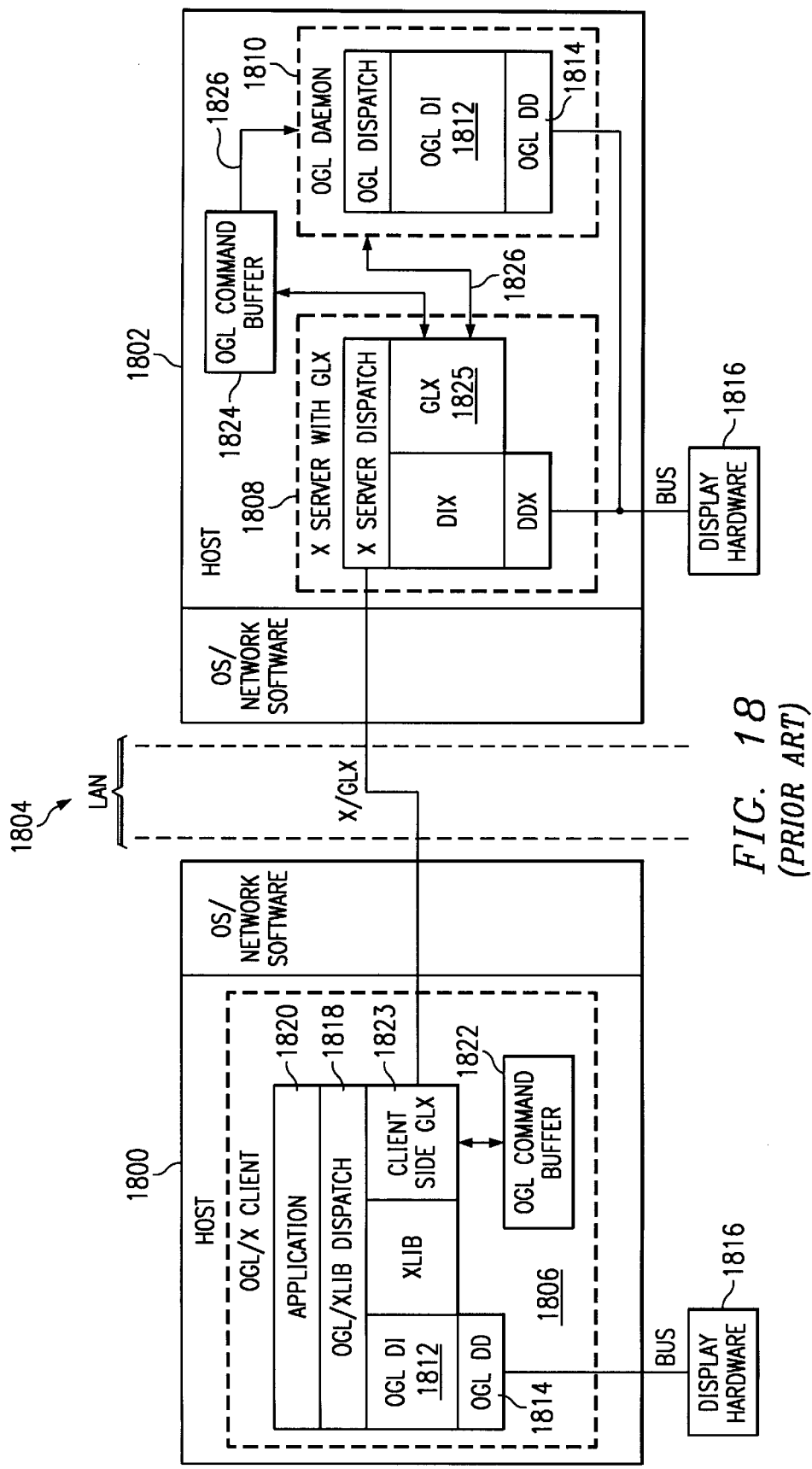
FIG. 18 is a schematic diagram illustrating a prior art configuration for performing 3D operations with OpenGL in a single screen over a network in an X Window System environment.

FIG. 18 illustrates a typical prior art implementation wherein single-screen 3D accelerated graphics operations are performed over a network in an X Window System environment. Two computer systems are used. Host 1800 is connected to host 1802 via and LAN 1804. As can be seen from the drawing, a total of three processes are running on hosts 1800 and 1802. (For more information on this three-process model, see Kevin T. Lefebvre, et al., "An Overview of the HP OpenGL Software Architecture," Hewlett-Packard Journal Vol. 49, No. 2, pp. 9–18 (May 1998), which article is hereby incorporated entirely by reference.) An OGL/X client process 1806 is running on host 1800. An X server process 1808 and an OGL daemon process 1810 process are running on host 1802. X server process 1808 is one that includes the GLX extension. Both OGL/X client 1806 and OGL daemon 1810 have an OpenGL implementation that includes a device independent ("DI") OGL layer 1812 and a device dependent ("DD") OGL layer 1814. The purpose of OGL DI layer 1812 and OGL DD layer 1814 is to execute OpenGL commands and to drive 3D accelerated display hardware 1816. OGL DI layer 1812 has one set of routines for local rendering, and another set of routines for rendering over network 1804. The local versus remote modes are initialized by loading pointers to the desired set of routines in a dispatch table in OGL/Xlib dispatch layer 1818. Each OGL command that comes from application 1820 will point to a particular entry in the dispatch table. By placing a different pointer in that entry, a different routine may be used to implement the OGL command corresponding to that entry. For a more detailed discussion of this kind of dispatch table indirection, see for example U.S. Pat. No. 5,321,808, titled "Dual Process Display Server," by Lawrence E. Rupp, which patent is hereby incorporated entirely by reference.

In the example of FIG. 18, if the local mode is chosen, then OGL commands issued by application 1820 will be rendered directly on the display hardware 1816 that is coupled to host 1800. But if the remote mode is chosen, then OGL commands issued by application 1820 will be routed to X server process 1808 using the GLX extension protocol. From there, they are routed to OGL daemon process 1810, which executes them and renders the result on the display hardware 1816 that is coupled to host 1802. In order to make better use of network bandwidth when operating in the remote mode, OGL commands are buffered on the client side in a buffer such as OGL command buffer 1822. OGL command buffer 1822 is created and managed by client-side GLX library 1823. OGL commands are buffered on the server side in a buffer such as shared memory OGL command buffer 1824. GLX extension 1825 within X server process 1808 creates, manages and fills shared memory OGL command buffer 1824. OGL daemon 1810 has a shared memory connection to OGL command buffer 1824, as shown at 1826. It uses shared memory connection 1826 to read OGL command buffer 1824 so that it can execute the commands stored there. An direct inter-process connection between OGL daemon 1810 and X server process 1808 also exists, as shown at 1826. Using direct inter-process connection 1826, X server process 1808 can, for example, communicate to OGL daemon 1810 when shared memory OGL command buffer 1824 is ready to be read.

3.2 Structure

Figure 19:
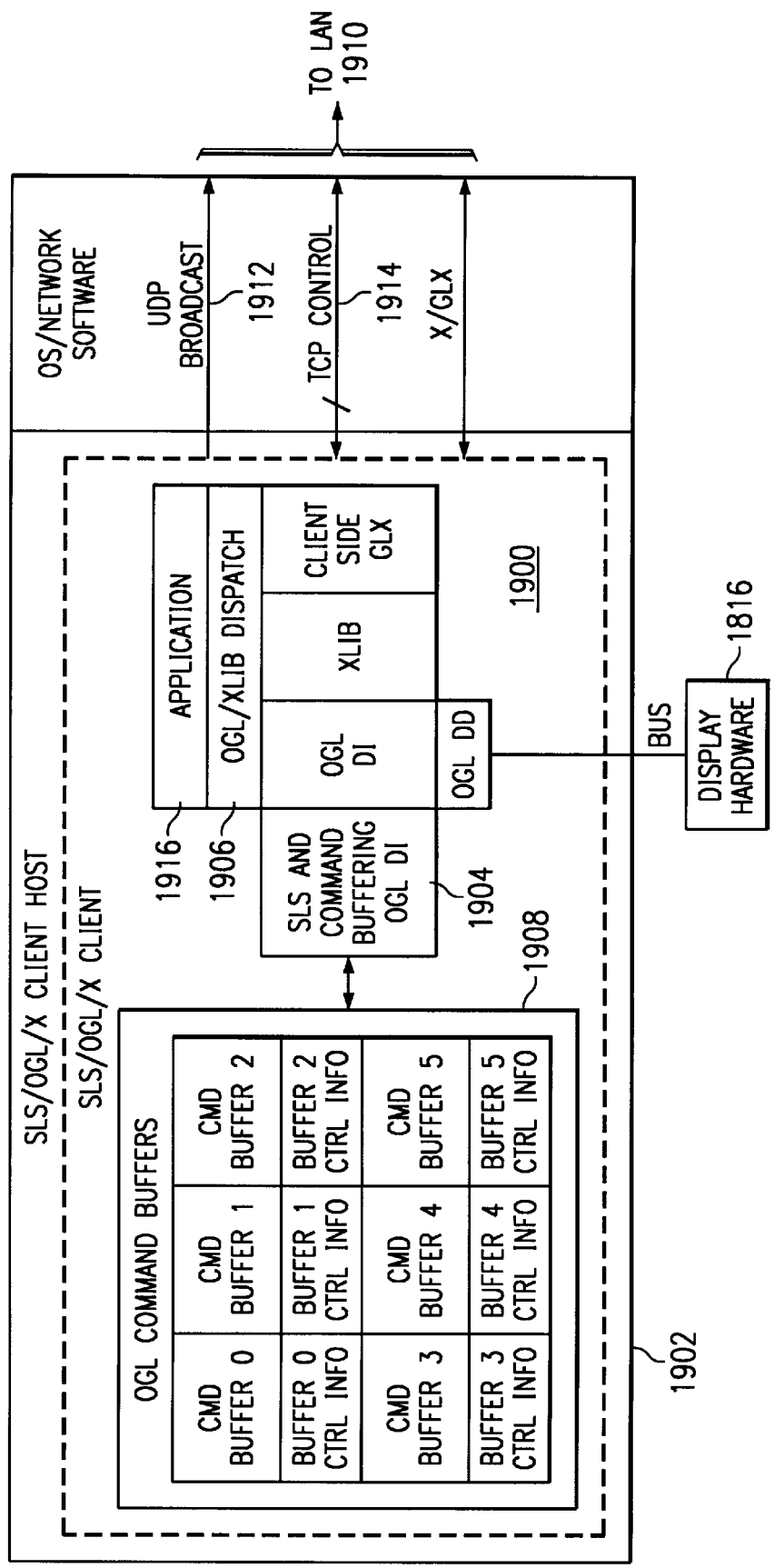
FIG. 19 is a schematic diagram illustrating an SLS/OGL/X client according to a preferred embodiment of the invention.

FIG. 19 illustrates an SLS/OGL/X client process 1900 according to a preferred embodiment of the invention. SLS/OGL/X client 1900 runs on host 1902. In addition to the OpenGL implementation contained in OGL/X client 1806, the inventive SLS/OGL/X client 1900 contains a library of device independent-layer routines identified in the drawing as SLS and command buffering OGL DI 1904. Client 1900 has a new mode of operation called "SLS" mode. This mode of operation is initialized by setting the OGL command pointers in dispatch layer 1906 to point to the routines contained in SLS and command buffer OGL DI 1904. Thus, in the preferred embodiment, 3D SLS functionality is provided at the OpenGL API dispatch layer.

OGL DI routines 1904 implement a more elaborate OGL command buffering scheme than does client 1806 of the prior art. A number of OGL command buffers 1908 are created and maintained, each having a buffer control info data structure associated with it, as shown. Although "n" OGL command buffers may be used, in a preferred embodiment six such command buffers were implemented. It is believed that different numbers of buffers may be better suited for other implementations depending on the host environment and desired performance considerations. The content and use of the buffer control info data structures in OGL command buffers 1908 will be discussed in more detail below. In addition to creating and maintaining OGL command buffers 1908, OGL DI routines 1904 maintain a UDP broadcast connection 1912 to LAN 1910 as well as a plurality of TCP control connections 1914 to LAN 1910. UDP broadcast connection 1912 is used to broadcast the contents of OGL command buffers 1908 to a plurality of SLS/OGL/X slave hosts (which slave hosts will be described in more detail below). TCP control connections 1914 are used to coordinate the broadcasting of OGL command buffers; for example, TCP control connections 1914 may be used to determine whether or not all of the SLS/OGL/X slave hosts have properly received the broadcasts. A preferred method for using TCP control connections 1914 to coordinate the broadcasting of OGL command buffers will be discussed in more detail below.

Figure 20:
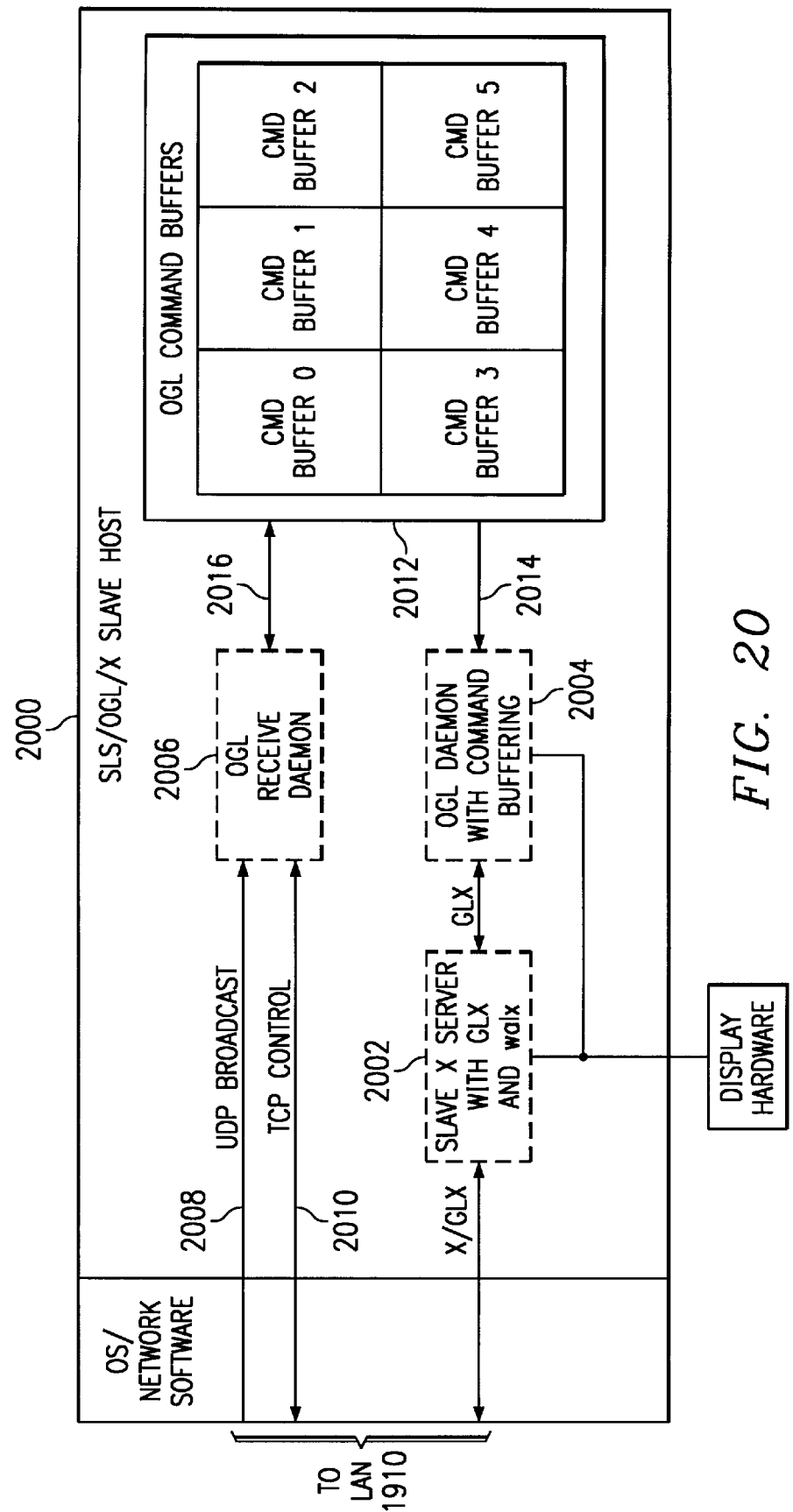
FIG. 20 is a schematic diagram illustrating an SLS/OGL/X slave according to a preferred embodiment of the invention.

FIG. 20 illustrates a representative one of the SLS/OGL/X slave hosts referred to in the preceding paragraph. Three processes run on SLS/OGL/X slave host 2000: a slave X server 2002, an OGL daemon 2004, and a receive daemon 2006. Slave X server 2002 is the same as each of slave servers 312–318, except that slave X server 2002 implements the GLX extension to the X protocol. The functionality of OGL daemon 2004 is similar to that of OGL daemon 1810 described above; the ways in which its functionality differs from that of OGL daemon 1810 will be described in more detail below. Receive daemon 2006 is responsible for a number of operations that will be described in more detail below. Briefly, however: It establishes and listens to a UDP broadcast connection 2008 to client host 1902. It establishes a TCP connection 2010 and uses it to communicate with client host 1902 to control broadcasting on UDP connection 2008. And it creates and maintains a set of shared memory OGL command buffers 2012. To fill OGL command buffers 2012 and to test whether or not they have been utilized by OGL daemon 2004, receive daemon uses shared memory connection 2016. Shared memory command buffers 2012 are utilized by OGL daemon 2004 via shared memory connection 2014.

Figure 21:
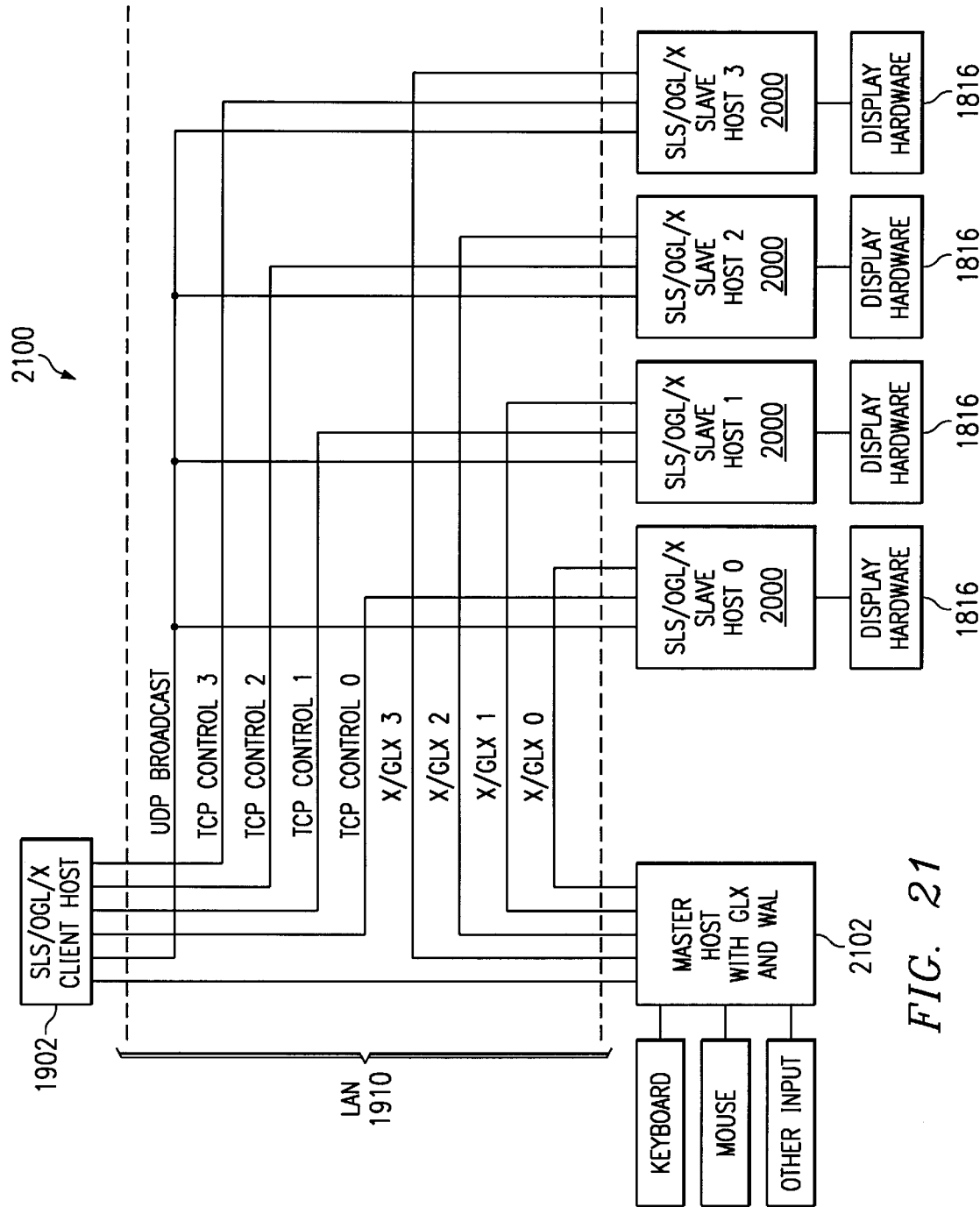
FIG. 21 is a schematic diagram illustrating a 3D single logical screen display using multiple remote computer systems according to a preferred embodiment of the invention.

FIG. 21 illustrates a 3D single logical screen display system 2100 according to a preferred embodiment of the invention. SLS/OGL/X host 1902 is coupled via LAN 1910 to master host 2102 and SLS/OGL/X slave hosts 0–3. Each of slave hosts 0–3 may be configured like the above-described representative slave host 2000. Master host 2102 may be configured like host 300, except that master host 2102 must also implement the GLX extension to the X protocol. As can be seen from the drawing, each of slave hosts 0–3 shares a UDP broadcast connection with client host 1902. But each of slave hosts 0–3 has a separate TCP connection to client host 1902. The above-described 2D substrate SLS functionality is provided by X/GLX protocol connections 0–3 between master host 2102 and slave hosts 0–3, respectively. In order to achieve satisfactory performance, LAN 1910 may be implemented with a 1 Gbit ethernet solution.

Figure 22:
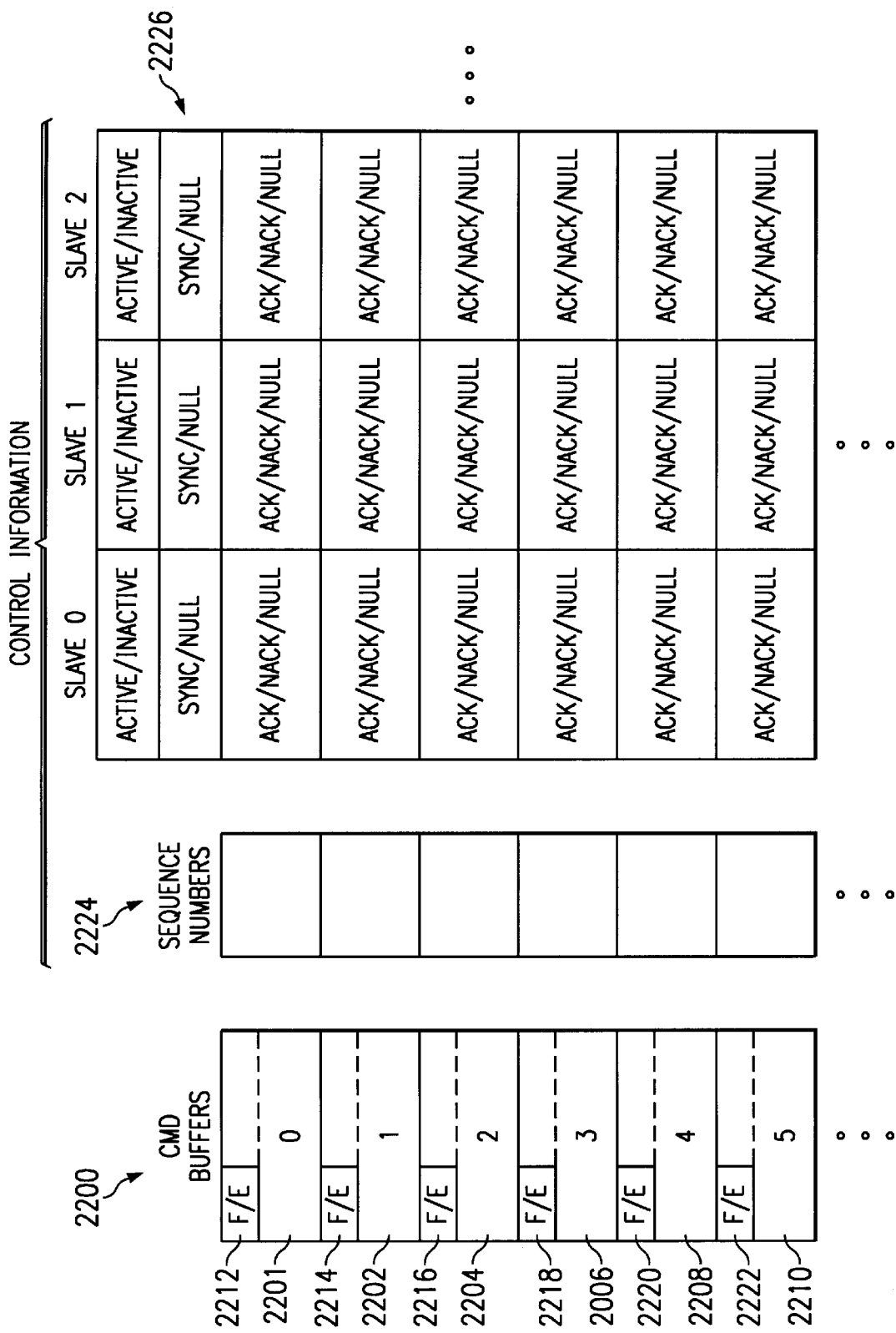
FIG. 22 is a block diagram illustrating the OGL command buffers and control information structures of FIG. 19 in more detail.

FIG. 22 illustrates OGL command buffers 1908 and their associated control information strucutres in more detail. Each OGL command buffer 2201–2210 is preferably organized so that each line in the buffer is the same size as a cache line. The first few bytes of each buffer may be used as a full/empty indicator, as shown at 2212–2222. As was mentioned above, "n" buffers may be used; the number of buffers shown in the illustrated embodiment is chosen by way of example only. An array of sequence numbers 2224 is also maintained, with one entry for every command buffer. (The values in this array correspond to the "sequencenum" values referred to in the pseudocode below. Each sequnce number corresponds to a particular buffer that has been broadcast, and is associated with the ack or nack responses received from the slaves.) Finally, a slave information array 2226 is also maintained. The slave information array 2226 contains one column for each slave, and one row for each command buffer, as shown. Each command buffer row in slave information array 2226 contains an "ack/nack/null" field. (At a given moment, each of these fields may be set to either ack, nack or null.) In addition to the rows of "ack/nack/null" fields, each column has an "active/inactive" field and a "sync/null" field. The use of all of these fields will become apparent in the context of the discussion below. Just as the number of command buffers may be "n," the number of slaves may also be "n," as is indicated by the elipses in the drawing.

Slave-side OGL command buffers 2012 may be organized in the samne way as command buffers 2200 are organized.

3.3 Operation

In broad overview, SLS and command buffering OGL DI routines 1904 effectively capture the OGL commands issued by application 1916 and buffer them in OGL command buffers 1908. When it is appropriate to flush one of buffers 1908, routines 1904 broadcast the buffer's contents to the slaves. Routines 1904 then issue a GLX "buffer ready" call to each slave in order to cause each slave to process the just-broadcast buffer. The receive daemon 2006 in each slave receives the broadcast buffer, stores its contents in a predetermined one of buffers 2012, and marks the predetermined buffer full. In response to the GLX "buffer ready" call, OGL daemon 2004 looks at the predetermined buffer in buffers 2012, waits until it has been marked full by receive daemon 2006, and then executes the OGL commands represented in the buffer.

Each of these operations will now be discussed in more detail.

3.3.1 Buffering and Sending

Figure 23:
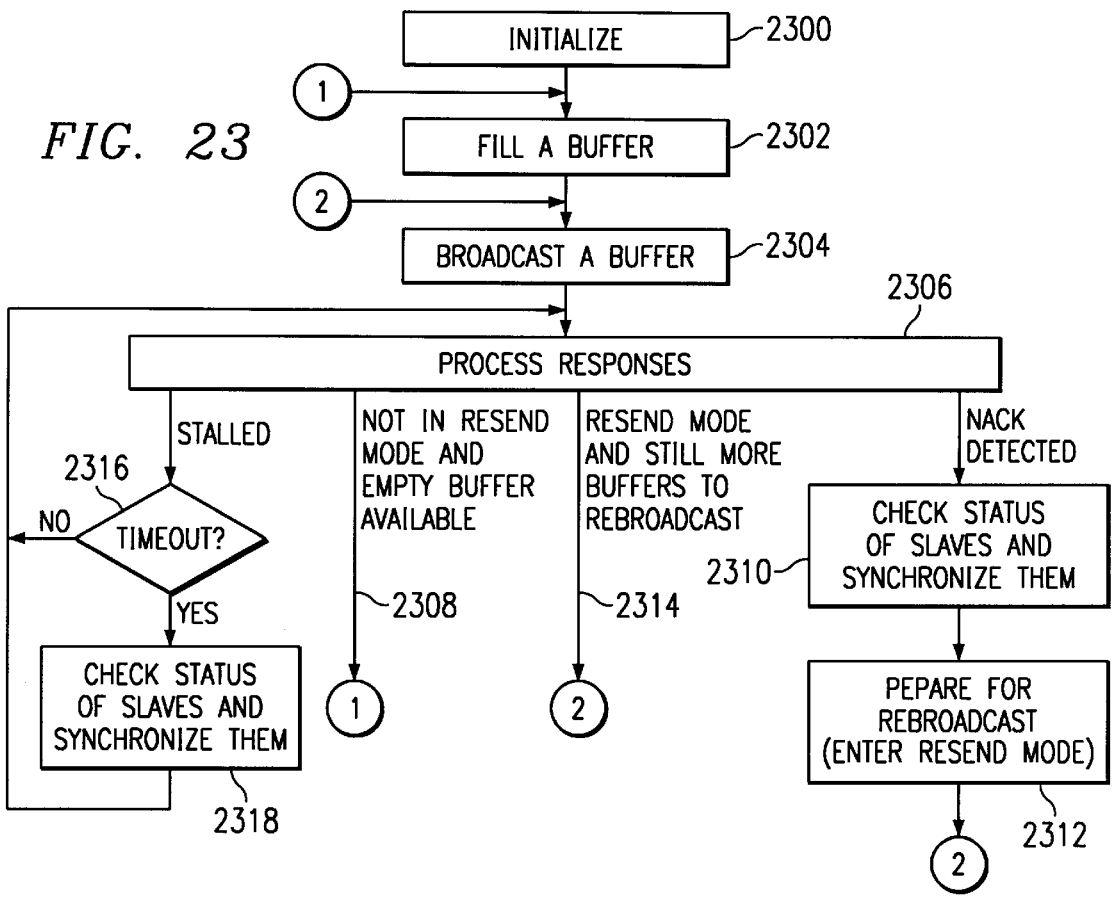
FIG. 23 is a flow diagram illustrating a command buffering, flushing and sending technique according to a preferred embodiment of the invention.

A preferred method for buffering and sending is illustrated in FIG. 23. Values are initialized in step 2300, and then a buffer is filled in step 2302. When it is appropriate to flush the buffer, the buffer is broadcast to all slaves in step 2304 using UDP broadcast connection 1912. Next, in step 2306, responses are gathered from each of slave TCP control connections 1914, and appropriate entries are made in control information structures 2224 and 2226. If a nack has been detected, operation continues with steps 2310 and 2312: The status of each slave is checked, all slaves are synchronized, and preparation is made for the rebroadcast of any buffers that were nacked (resend mode is entered). Alternatively, if a nack has not been detected and at least one empty buffer is available in OGL command buffers 1908, then a new buffer filling operation begins at step 2302. If the machine is currently rebroadcasting, and more buffers still need to be rebroadcast, then operation continues at step 2304. But if the machine is stalled (if no buffers are available to be filled), then a timeout is observed as indicated at step 2316. If after the timeout the machine remains stalled, then the slaves are checked and synchronized in step 2318, and operation continues with step 2306.

Each of the above steps is explained in detail in the following pseudocode. (Note: This pseudocode is provided by way of example only; persons having ordinary skill in the art will recognize that other techniques, routines or functions may be used to implement the inventive functionality without departing from the spirit and scope of the invention as defined by the appended claims. For example, uses made in the pseudocode of particular indexes, counters and pointers are not intended to limit the scope of the invention to implementations that use those particular indexes, counters and pointers.) In the pseudocode, the acronyms "LPB" and "HPB" stand for "Lowest Pending Buffer" and "Highest Pending Buffer." A "pending" buffer is one that has been broadcast, but for which not all slaves have sent an acknlowedgment. "Sequencenum" is an incrementing value that rolls over to zero once it has reached its maximum value. It is used by the slaves to determine whether a particular broadcast is a new broadcast or a rebroadcast. Importantly, the range of possible values for sequencenum should exceed the range of possible values for the buffer index. For example, in an implementation that has 6 buffers, the highest buffer in the 6-buffer rotation might be designated buffer(5). In such an implementation, the maximum value for sequencenum should be at least 6.

```
/* Pseudocode representation of command buffering, flush-
    ing and sending functionality */
main()
{
INITIALIZE:
for (each graphics command buffer)
    {
        mark full/empty field as empty;
    }
for (each slave TCP channel)
    {
        mark active/inactive field as active;
        clear sync field;
        clear sequencenum and nack/ack fields for each
            graphics command buffer;
    }
    sequencenum=-1;
    maxsequencenum=6;
    LPB=0;
    HPB=-1;
    resendflag=0;
    i=0;
FILL_A_BUFFER:
do
    {
        store graphics commands in buffer(i);
    }
while(not ready to flush buffer(i));
mark buffer(i)'s full/empty field as full;
messagesize=size of buffer(i)+size of keyword;
sequencenum++;
if (sequencenum>maxsequencenum) sequencenum=0;
BROADCAST_A_BUFFER:
transmit sequencenum and messagesize to each active slave
    individually using the TCP connections;
broadcast contents of buffer(i), followed by the keyword, to
    all slaves using the UDP broadcast connection;
if (resendflag==0)
    for (each active slave TCP channel)
        {
            write sequencenum into sequencenum field for
                buffer(i);
        }
HPB++;
if (HPB>5) HPB=0;
if (resendflag==0) send GLX "buffer ready" call to each
    slave;
```

PROCESS_RESPONSES:
/* Update sync fields and ack/nack fields */
for (each active slave)
    {
        retrieve all pending messages from this slave's TCP
            channel input buffer;
        modify the sync field and the ack/nack fields for this
            slave appropriately based on the messages retrieved;
    }
/* Loop on pending buffers, checking for any nacks first,
    then checking for all acks */
for (all pending buffers from LPB to HPB)
{
    /* Check for any nacks */
    if (any active slave has a nack stored in association with
        this buffer)
        /* If nack occurred, need to rebroadcast all previously-
            broadcast buffers */
        check_status_of_slaves_and_synchronize_them
            ();
        prepare_for_rebroadcasting();
        goto BROADCAST_A_BUFFER;
    {
    /* Check for all acks */
    if (every active slave's TCP channel has an ack stored in
        association with this buffer)
        /* If all acks occurred for a buffer, that buffer may be
            "retired" by marking it empty */
        }
        mark this buffer as empty,
        clear nacks/acks for this buffer;
        LPB++;
        if (LPB>5) LPB=0;
    }
}
/* End loop on pending buffers */
/* If the next buffer in the rotation is empty . . . */
if (i+1==6) next=0;
else next=i +1;
if (buffer(next) is empty)
    {
        resendflag=0;
        i++;
        if(i>5)i=0;
        goto FILL_A_BUFFER;
    }
/* If next buffer is not empty and we are in resend mode . .
    . */
else if (resendflag==1)
    {
        if (next=LPB) /* If next=LPB, then we've stalled while
            rebroadcasting */
            {
                if (timeout has occurred)
                    check_status_of_slaves_and_
                        synchronize_them();
                goto PROCESS_RESULTS;
            }
        i++;
        if(i>5)i=0;
        sequencenum=sequencenum previously stored in asso-
            ciation with buffer(i) for each channel;
        pacektsize=size of buffer(i)+size of keyword;
        goto BROADCAST_A_BUFFER;
    }

Figure 24:
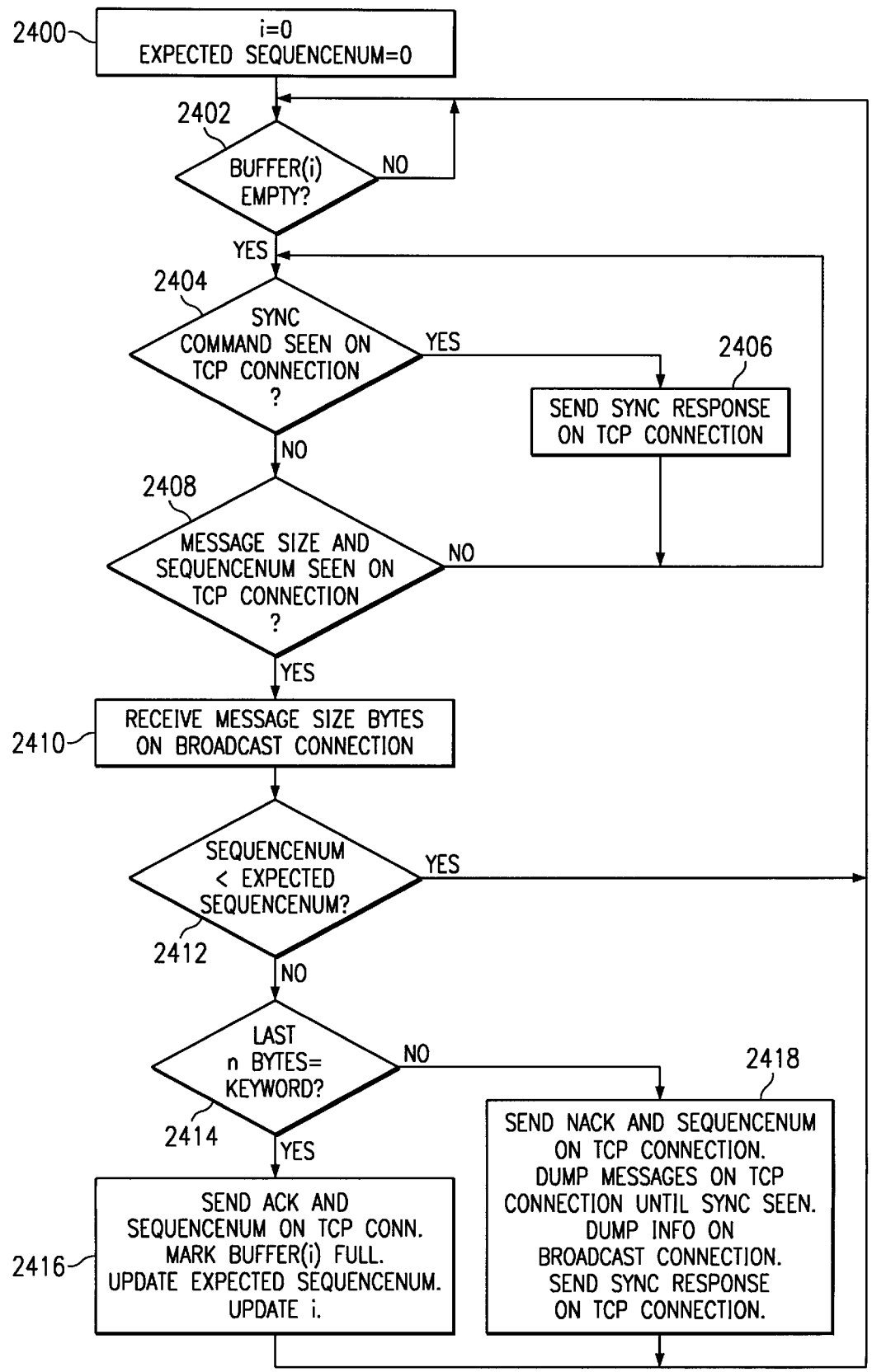
FIG. 24 is a flow diagram illustrating a command buffer receiving technique according to a preferred embodiment of the invention.

/* If next buffer is not empty and we are not in resend mode
    . . . (This means we've stalled.) */
else
    {
        if (timeout has occurred)
            check_status_of_slaves_and_synchronize_them
                ();
        goto PROCESS_RESPONSES;
    }
} /* End Main */
void check_status_of_slaves_and_synchronize_themo()
for (each active slave)
    send a control message to the slave requiring the slave
        to SYNCHRONIZE;
    {
while(at least one active slave's sync field==null && tim-
    eout has not occurred)
    }
    for (each active slave TCP channel)
        {
            retrieve all pending messages from the input
                buffer;
            modify the sync field and the ack/nack fields for
                the channel appropriately based on the mes-
                sages retrieved;
        }
    }
if (timeout occurred)
    for every slave whose sync field==null mark the active/
        inactive field as inactive;
for(each active slave)
    {
        clear the sync field;
    }
retun();
void prepare_for_rebroadcasting()
for(each active slave)
    {
        clear any nack entries from buffer(LPB) to buffer
            (HPB), but leave ack entries intact;
i=LPB;
resendflag=1;
messagesize=size of buffer(i)+size of keyword;
sequencenum=sequencenum previously stored in associa-
    tion with buffer(i);
HPB=LPB-1;
retun();
    3.3.2 Receiving
    FIG. 24 illustrates a preferred receive routine to be
implemented by receive daemon 2006. In step 2400, values
are initialized. The buffer index i is set to 0. And an
"expected sequencenum" is set to 0. In step 2402, the
daemon checks whether buffer(i) is empty by checking the
full/empty field in the buffer. If the buffer is empty, then the
daemon looks at its TCP control connection. If a "sync"
command is seen there in step 2404, then the daemon
immediately sends a "sync" response back to host 1902 on
the TCP connection in step 2406. If instead a messagesize
and sequencenum are seen on the TCP input in step 2408,
then operation continues with step 2410.
    In step 2410, the daemon receives messagesize bytes of
data from the broadcast UDP connection. In step 2412, it
then checks whether the sequencenum received in step 2408
is less than the expected sequencenum. If so, then the
broadcast just received was merely a rebroadcast of a buffer
that this slave has already successfully received. Therefore, operation may resume again at step 2402. On the other hand, if the sequencenum was not less than the expected sequencenum, then the daemon needs to process the just-received buffer. In step 2414, the daemon compares the last bytes of the broadcast to a predetermined keyword. (The keyword may be any predetermined data pattern that is not expected to be a part of any OGL command buffer contents, or it may be derived from the contents of the the OGL command buffer according to an algorithm or formula. The purpose of the keyword is to provide an integrity check. If the keyword is recognized in the place where it is expected, the daemon may have some assurance that the broadcast was successfully received.) If the keyword is recognized in step 2414, then the daemon proceeds to step 2416. In step 2416, it sends an "ack" response to host 1902, along with the sequence number of the buffer being acked; it marks the buffer full; it updates the expected sequencenum (by incrementing it and setting it to 0 if it has exceeded its maximum value); and it updates the buffer index i (also by incrementing it and setting it to 0 if it has exceeded its maximum value). But if the keyword is not recognized in step 2416, then the daemon executes a nack routine in step 2418: It sends a "nack" response to host 1902, along with the sequence number of the buffer being acked, using the TCP connection. It drains all messages from its TCP input buffer until it sees a sync message there. Then, it drains all data from its UDP input buffer. Finally, it sends a sync response to host 1902 using the TCP connection. Operation resumes at step 2402.

3.3.3 Rendering

Figure 25:
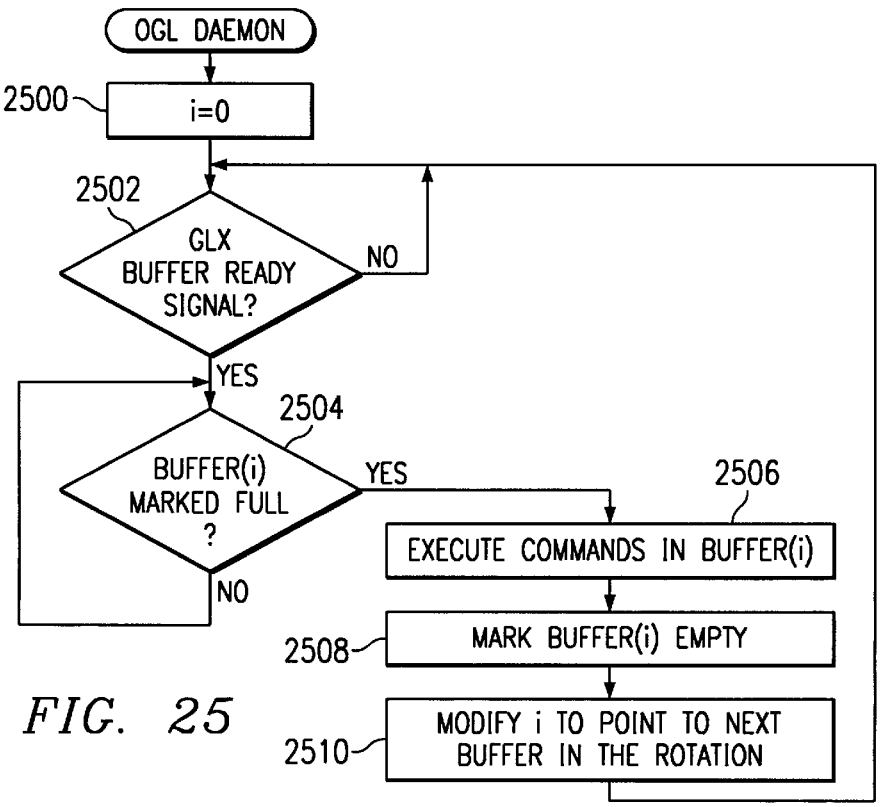
FIG. 25 is a flow diagram illustrating a rendering technique according to a preferred embodiment of the invention.

FIG. 25 illustrates preferred functionality to be implemented by OGL daemon 2004. In step 2500, the buffer index i is initialized to 0. In step 2502, the daemon waits for a GLX "buffer ready" signal from host 1902. Once this signal is seen, the daemon tests the full/empty field of buffer(i) to see if it is full. (Buffer(i) is one of buffers 2012.) Once the daemon sees that buffer(i) is full, in step 2506 it executes all of the OGL commands represented in the buffer. In step 2508 it marks the buffer empty. And in step 2510, it advances the buffer index i to point to the next buffer in the rotation. (It does this by incrementing i, comparing i to its maximum value, and setting i to 0 if it has exceeded its maximum value.) Operation resumes at step 2500.

A primary advantage of the inventive 3D single logical screen display system is that it provides single logical screen functionality that is totally transparent to client application 1916. Another advantage of the inventive 3D SLS display system is that OGL command buffers by-pass the X server completely, thereby enhancing performance. Still another advantage of the inventive display system is that each physical display device in the 3D single logical screen may be supported by a separate host's backplane, thereby enabling very large 3D single logical screens to be constructed. Yet another advantage is the operational simplicity of the implementation: Each OGL command buffer is simply broadcast to each of the slaves, and the proper x,y offsets for each slave's rendering operations are determined automatically by the above-described 2D SLS substrate architecture. (Recall from the above discussion of the 2D SLS substrate architecture that each WindowRec on each slave has the information in its origin field offset in accordance with the xOffset, yOffset information in the WalSlaveRec data structure for that slave. This information automatically accompanies a clip list query; it need simply be written into the appropriate registers of display hardware 1816, and 3D rendering operations may continue.)

In alternative embodiments, other network protocols and techniques may be used to accomplish the communication of OGL command buffer contents from the application host to the slave hosts. For example, in one alternative embodiment, UDP multicasting may be used in lieu of UDP broadcasting.

While the invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that will remain within the scope of the appended claims.

What is claimed is:

1. A method for performing 3D graphics operations on a logical screen that comprises composited outputs from multiple computer graphics pipelines, the method comprising the steps of:

providing a client process, a master server process and a plurality of slave server processes wherein each slave server process is operable to drive one of the pipelines;

in the master server process, dividing the logical screen among the slave server processes by storing a different set of x/y offset information for each of the slave server processes;

in the client process, switching to a logical screen mode in which 3D graphics API commands issued by an application are buffered;

in the client process, buffering a set of 3D graphics API commands issued by the application;

using a network, flushing the same buffered set of 3D graphics API commands to hosts of all of the different slave server processes; and in each of the slave server processes, processing the flushed set of 3D graphics API commands differently responsive to x/y offset information received from the master server process.

2. The method of claim 1, wherein:

in each of the hosts of the slave server processes, providing a receive daemon process; and in the receive daemon processes, receiving from the network and storing the flushed set of 3D graphics API commands in a manner that bypasses the slave server process.

3. The method of claim 2, further comprising the step of:

in the client process after the flushing step, and again using the network, sending a buffer ready command to the slave server processes.

4. The method of claim 3, wherein:

the processing step is performed responsive to the buffer ready command.

5. The method of claim 1, wherein the flushing step comprises broadcasting the buffered set of 3D graphics API commands to hosts of all of the different slave server processes.

6. The method of claim 5, wherein the broadcasting step utilizes a UDP broadcast connection between the client process and the receive daemon processes.

7. The method of claim 6, further comprising the step of:

after the flushing step, and again using the network, sending a buffer ready command to the slave server processes, wherein the sending step utilizes windowing system protocol over non-broadcast connections between the client process and each of the slave server processes.

8. The method of claim 6, further comprising the step of:

in each of the receive daemon processes, sending ack/nack information to the client process responsive to the broadcasting step.

9. The method of claim 8, wherein the step of sending ack/nack information utilizes TCP control connections between each of the receive daemons and the client process.

10. The method of claim 1, wherein the flushing step comprises multicasting the buffered set of 3D graphics API commands to hosts of all of the different slave server processes.

11. The method of claim 1, wherein the x/y offset information received from the master server process is received responsive to a clip list inquiry.

12. Apparatus for performing 3D graphics operations on a logical screen that comprises composited outputs from multiple computer graphics pipelines, the apparatus comprising:
  a client process;
  a master server process;
  a plurality of slave server hosts, each operable to drive one of the pipelines; and
  a network connecting the client process with the master server process and with the slave server hosts, and connecting the slave server hosts with the master server process;
  wherein the master server process comprises offset logic for dividing the logical screen among the slave server hosts by storing a different set of x/y offset information for each slave server host;
  wherein the client process comprises logical screen mode logic for buffering 3D graphics API commands issued by an application and flushing a set of buffered commands to each of the slave server hosts over the network; and
  wherein each of the slave server hosts comprises display logic for processing the flushed set of commands responsive to x/y offset information received from the master server process over the network.

13. The apparatus of claim 12, wherein each slave server host comprises:
  a slave server process;
  a receive daemon; and
  a 3D graphics API daemon;
  wherein the slave server process is operable to receive x/y offset information from the master server process over the network;
  wherein the receive daemon is operable to receive from the network and store the set of buffered commands that is flushed by the client process, and is able to do so in a manner that bypasses the slave server process; and
  wherein the 3D graphics API daemon is operable to execute the received and stored set of buffered commands.

14. The apparatus of claim 13, wherein the receive daemon comprises:
  buffer receipt connection logic for establishing and monitoring a buffer receipt connection with the client process.

15. The apparatus of claim 14, wherein:
  the buffer receipt connection is a broadcast connection.

16. The apparatus of claim 15, wherein the receive daemon also comprises:
  control connection logic for establishing and utilizing a control connection with the client process, and wherein the client process and the receive daemon use the control connection to coordinate broadcasting of the set of buffered commands over the broadcast connection.

17. The apparatus of claim 16, wherein the broadcast connection is a UDP connection and the control connection is a TCP connection.

18. The apparatus of claim 14, wherein:
  the buffer receipt connection is a multicast connection.

19. The apparatus of claim 12, wherein the client process comprises:
  a library of device independent routines for implementing the logical screen mode logic at the API dispatch layer.

20. The apparatus of claim 19, wherein the library of device independent routines is also operable to establish and utilize the network connections between the client process and the master server process, and between the client process and the slave server hosts.

21. A machine-readable storage or transmission medium containing code that, when executed on computers, causes the computers to perform 3D graphics operations on a logical screen that comprises composited outputs from multiple computer graphics pipelines, the method comprising the steps of:
  providing a client process, a master server process and a plurality of slave server processes wherein each slave server process is operable to drive one of the pipelines;
  in the master server process, dividing the logical screen among the slave server processes by storing a different set of x/y offset information for each of the slave server processes;
  in the client process, switching to a logical screen mode in which 3D graphics API commands issued by an application are buffered;
  in the client process, buffering a set of 3D graphics API commands issued by the application; using a network, flushing the same buffered set of 3D graphics API commands to hosts of all of the different slave server processes; and
  in each of the slave server processes, processing the flushed set of 3D graphics API commands differently responsive to x/y offset information received from the master server process.

22. The machine-readable medium of claim 21, wherein:
  in each of the hosts of the slave server processes, providing a receive daemon process; and
  in the receive daemon processes, receiving from the network and storing the flushed set of 3D graphics API commands in a manner that bypasses the slave server process.

23. The machine-readable medium of claim 22, wherein the method further comprises the step of:
  in the client process after the flushing step, and again using the network, sending a buffer ready command to the slave server processes.

24. The machine-readable medium of claim 23, wherein:
  the processing step is performed responsive to the buffer ready command.

25. The machine-readable medium of claim 21, wherein the flushing step comprises broadcasting the buffered set of 3D graphics API commands to hosts of all of the different slave server processes.

26. The machine-readable medium of claim 25, wherein the broadcasting step utilizes a UDP broadcast connection between the client process and the receive daemon processes.

27. The machine-readable medium of claim 26, wherein the method further comprises the step of:
  after the flushing step, and again using the network, sending a buffer ready command to the slave server processes, wherein the sending step utilizes windowing system protocol over non-broadcast connections between the client process and each of the slave server processes.

28. The machine-readable medium of claim 26, wherein the method further comprises the step of:

in each of the receive daemon processes, sending ack/nack information to the client process responsive to the broadcasting step.

29. The machine-readable medium of claim 28, wherein the step of sending ack/nack information utilizes TCP control connections between each of the receive daemons and the client process.

30. The machine-readable medium of claim 21, wherein the flushing step comprises multicasting the buffered set of 3D graphics API commands to hosts of all of the different slave server processes.

31. The machine-readable medium of claim 21, wherein the x/y offset information received from the master server process is received responsive to a clip list inquiry.

* * * * *

UNITED STATES PATENT AND TRADEMARK OFFICE
CERTIFICATE OF CORRECTION

PATENT NO.   : 6,249,294 B1
DATED        : June 19, 2001
INVENTOR(S)  : Kevin Lefebvre et al.

It is certified that error appears in the above-identified patent and that said Letters Patent is hereby corrected as shown below:

Column 1,
Line 36, after "also be" insert -- provided so that objects presented on the composite screen may be moved about and otherwise manipulated freely without regard to the fact that different portions of the objects are actually displayed on different physical display devices. In other words, the different physical display devices comprising the composite screen must be controlled in concert so that they present the illusion of one large logical screen to the viewer. This kind of functionality has become known as "single logical screen" functionality, or simply "SLS." One solution for providing 2D single logical screen functionality in an X Window System environment is taught by Jeffrey J. Walls, Ian A. Elliott and John Marks in U.S. patent application serial number 08/584755, filed January 10, 1996, titled "A Design and Method --

Column 2,
Line 5, delete "The X Window System Server" and insert therefor
-- The X Window System Server --

Column 24,
Line 11, delete "void check_status_of_slaves_and _synchronize_themo()" and insert therefor -- void check_status_of_slaves_ and_synchrnozie_them() --

Signed and Sealed this

Twenty-eighth Day of January, 2003

JAMES E. ROGAN
*Director of the United States Patent and Trademark Office*